(12) United States Patent
Merz

(10) Patent No.: US 8,464,417 B2
(45) Date of Patent: Jun. 18, 2013

(54) METHOD FOR COVER GLASS REMOVAL

(75) Inventor: Nicholas G. L. Merz, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 80 days.

(21) Appl. No.: 13/038,241

(22) Filed: Mar. 1, 2011

(65) Prior Publication Data
US 2012/0198688 A1     Aug. 9, 2012

Related U.S. Application Data

(60) Provisional application No. 61/441,275, filed on Feb. 9, 2011.

(51) Int. Cl.
*H01S 4/00*    (2006.01)

(52) U.S. Cl.
USPC .............. 29/592.1; 29/825; 360/133

(58) Field of Classification Search
USPC ................... 29/592.1, 825; 360/133
See application file for complete search history.

(56) References Cited

U.S. PATENT DOCUMENTS 4,903,256 A * 2/1990 Nakahara ............. 720/734

* cited by examiner

*Primary Examiner* — Carl Arbes
(74) *Attorney, Agent, or Firm* — Dorsey & Whitney LLP

(57) ABSTRACT

Improved techniques are disclosed for disassembly of portable electronic devices. A portable electronic device can have a portable device housing having a cover piece. The techniques can apply controlled forces to remove the cover piece from the portable device housing. The controlled forces can include rotational and/or translational forces. The techniques allow for removal of the cover piece with little or no damage to the portable electronic device. For example, the cover piece can pertain to a glass cover member (e.g., cover glass) that forms an outer part of a portable device housing.

12 Claims, 29 Drawing Sheets

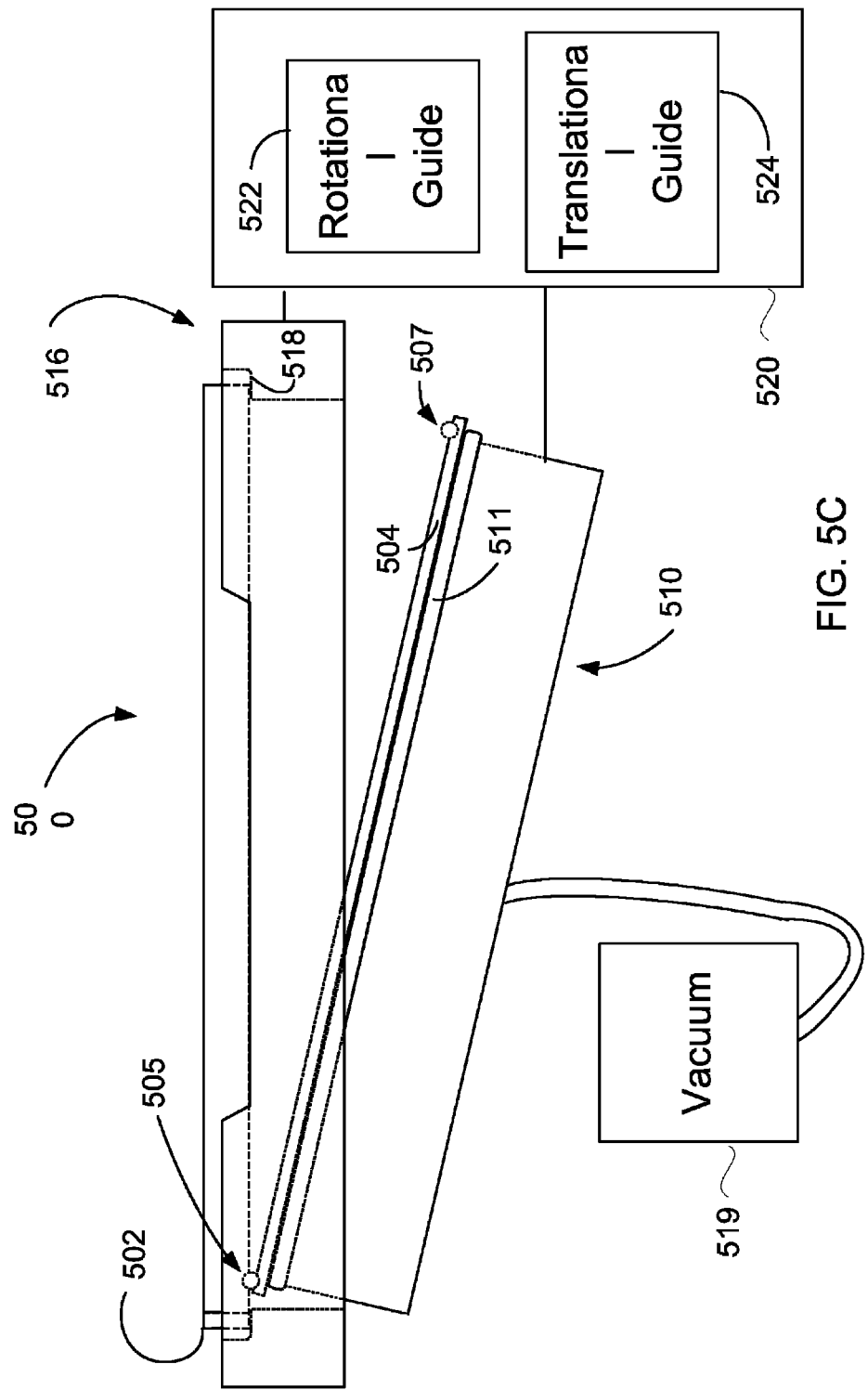

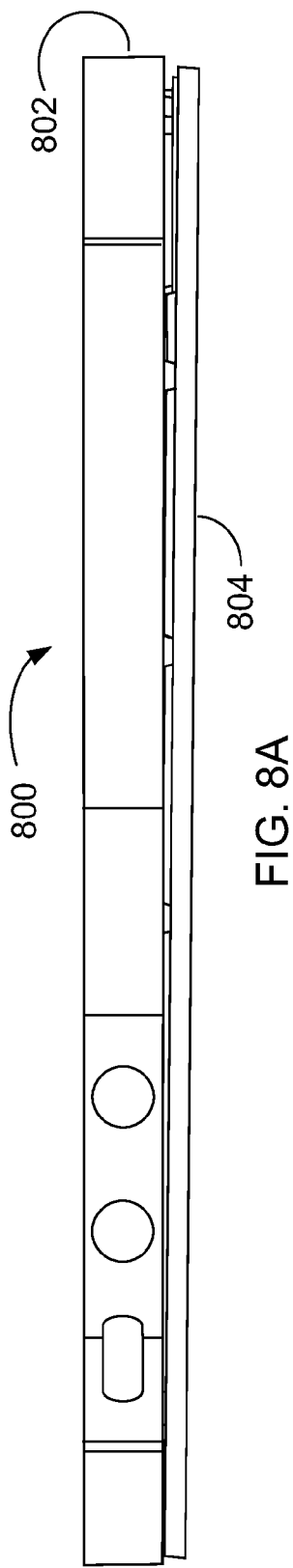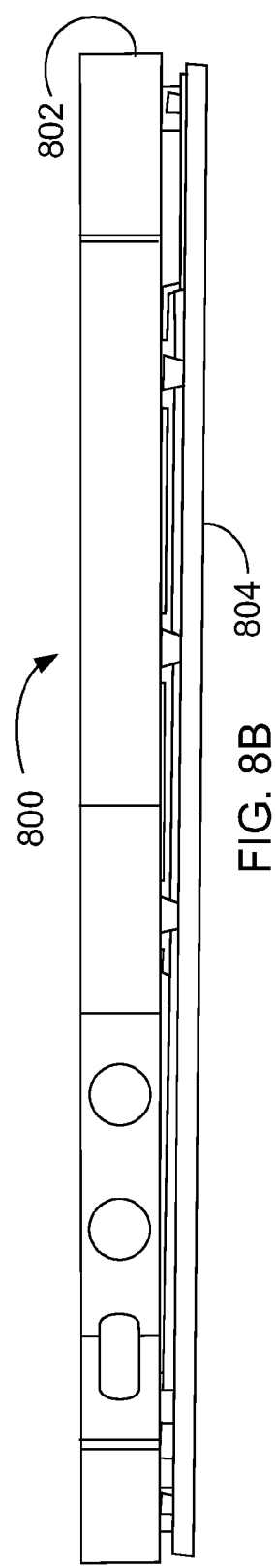

METHOD FOR COVER GLASS REMOVAL

CROSS-REFERENCE TO RELATED APPLICATION

This application claims priority benefit of U.S. provisional patent application 61/441,275, filed Feb. 9, 2011, and entitled "METHOD AND APPARATUS FOR COVER GLASS REMOVAL," which is hereby incorporated herein by reference.

BACKGROUND OF THE INVENTION

1. Field of the Invention

The present invention relates to portable electronic devices and, more particularly, to systems and techniques for removal of covers from such portable electronic devices.

2. Description of the Related Art

The pace of innovation in portable electronic devices continues to accelerate. Through innovations in hardware and software, multipurpose functionalities such as those of a digital camera, cellular telephone and media player can all be integrated into a single device, which can provide consumers with enhanced device performance and convenience. Examples such innovative portable electronic devices, which have achieved great popularity with consumers, are the iPhone™ and iPod™ products offered by Apple Inc. of Cupertino, Calif.

In addition to such increases in functionality, consumers also have increasing expectations for the appearance and form factor of portable electronic devices. Consumers may want devices that are not only fully capable but also relatively thin and lightweight and perhaps fashionable.

Naturally, significant engineering challenges must be overcome, in order to integrate various components into thin or low profile portable electronic devices. In can be particularly challenging to find ways to integrate one or more pieces (e.g., thin sheets) of glass or plastic into such designs. Glass or plastic may be used for covering displays, touch panels, camera assemblies or the like for portable electronic devices.

The principles of design for manufacturing may be employed in the engineering arts for designing products in such a way that they are easy to manufacture. Accordingly, various assembly techniques may be used, to ease and simplify the integration of glass or plastic, so as to provide for manufacturability of thin, low profile portable electronic devices. While such assembly techniques may provide many advantages, further difficulties may still remain. For example, one difficulty is that it can be difficult to disassembly portable electronic devices that incorporate glass or plastic into their design. Thus, there is a need for improved approaches to disassembly of portable electronic devices.

SUMMARY

Improved techniques are disclosed for disassembly of portable electronic devices. A portable electronic device can have a portable device housing having a cover piece. The techniques can apply controlled forces to remove the cover piece from the portable device housing. The controlled forces can include rotational and/or translational forces. The techniques allow for removal of the cover piece with little or no damage to the portable electronic device. For example, the cover piece can pertain to a glass cover member (e.g., cover glass) that forms an outer part of a portable device housing.

The invention can be implemented in numerous ways, including as a system, device, apparatus or method. Several embodiments of the invention are discussed below.

As an apparatus for disassembling a cover from a frame member of a portable electronic device, one embodiment includes at least: a fixture for releasable securing to the cover; a companion fixture for engaging the frame member; and a guide member coupled with the fixture and the companion fixture for guiding relative movement between the fixture and the companion fixture in disassembling the cover from the frame member of the portable electronic device.

As an apparatus for disassembling a cover from a frame member of a portable electronic device, another embodiment includes at least: a fixture for releasable securing to the cover; a companion fixture for engaging the frame member; and a rotational guide member coupled with the fixture and the companion fixture for guiding rotation of the fixture relative to the companion fixture in disassembling the cover from the frame member of the portable electronic device.

As a method for disassembling a cover from a frame member of a portable electronic device, one embodiment includes at least the acts of: releasably securing a fixture to the cover; engaging the frame member with a companion fixture; and separating the cover from the frame member.

As a method for disassembling a cover from a frame member of a portable electronic device, another embodiment includes at least the acts of: coupling the portable electronic device to at least one fixture; rotating relative to one another the cover and the frame member about a pivot point located remote from a distal adhesive bond between the cover and the frame, so as to allow application of sufficient force for breaking the distal adhesive bond; and translationally moving relative to one another the cover and the frame member, so as to allow application of sufficient force for breaking a proximate adhesive bond between the cover and the frame member.

As a method for disassembling a cover from a frame member of a portable electronic device, another embodiment includes at least the acts of: coupling the portable electronic device to at least one fixture; breaking a distal adhesive bond located between the cover and the frame and located remote from corresponding extremities of cover and frame member; and subsequently breaking a proximate adhesive bond located between the cover and the frame and located proximate to the corresponding extremities of the cover and the frame member.

A method for disassembling a cover from a frame member of a portable electronic device, another embodiment includes at least the acts of: inducing an angular removal force to the cover to partially break adhesive bonds between the cover and the frame member; and subsequently inducing a translational removal force to the cover to completely break the adhesive bonds between the cover and the force, thereby removing the cover from the frame member.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIGS. 5A-5D are a series of partial block diagrams and simplified side views illustrating disassembly of the portable electronic device using fixtures according to another embodiment.

FIGS. 8A and 8B are a series of more detailed side views of the portable electronic device, further illustrating the disassembly of the portable electronic device that is shown in FIGS. 7A-7D.

DETAILED DESCRIPTION OF EMBODIMENTS OF THE INVENTION

Improved techniques are disclosed for disassembly of portable electronic devices. A portable electronic device can have a portable device housing having a cover piece. The techniques can apply controlled forces to remove the cover piece from the portable device housing. The controlled forces can include rotational and/or translational forces. The techniques allow for removal of the cover piece with little or no damage to the portable electronic device. For example, the cover piece can pertain to a glass cover member (e.g., cover glass) that forms an outer part of a portable device housing.

Embodiments of the invention are discussed below with reference to FIGS. 1-12. However, those skilled in the art will readily appreciate that the detailed description given herein with respect to these figures is for explanatory purposes, as the invention extends beyond these limited embodiments.

Portable electronic devices may integrate one or more thin sheets of translucent glass or plastic into their designs. Glass or plastic may be used for covering displays, touch panels, camera assemblies or the like for the portable electronic devices. Various adhesives may be used in assembly techniques, to ease and simplify the integration of glass or plastic, so as to provide for manufacturability of thin, low profile portable electronic devices. While such assembly techniques may provide many advantages, re-work methodologies may require disassembly of portable electronic devices that have been assembled using adhesives.

Figure 1A:
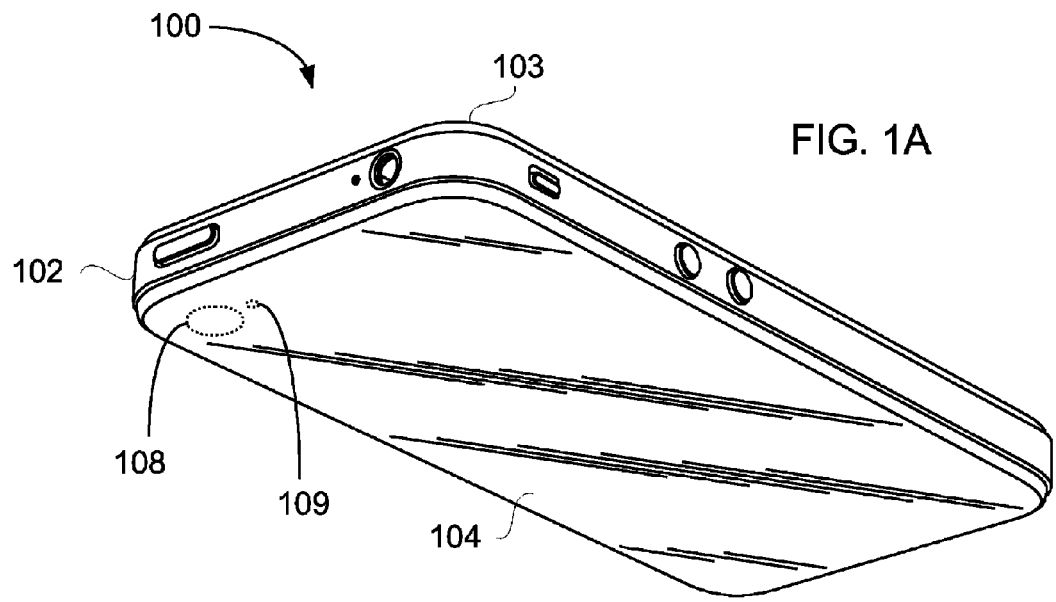
FIGS. 1A and 1B are isometric views of an exemplary portable electronic device, for disassembly using one embodiment.
Figure 1B:
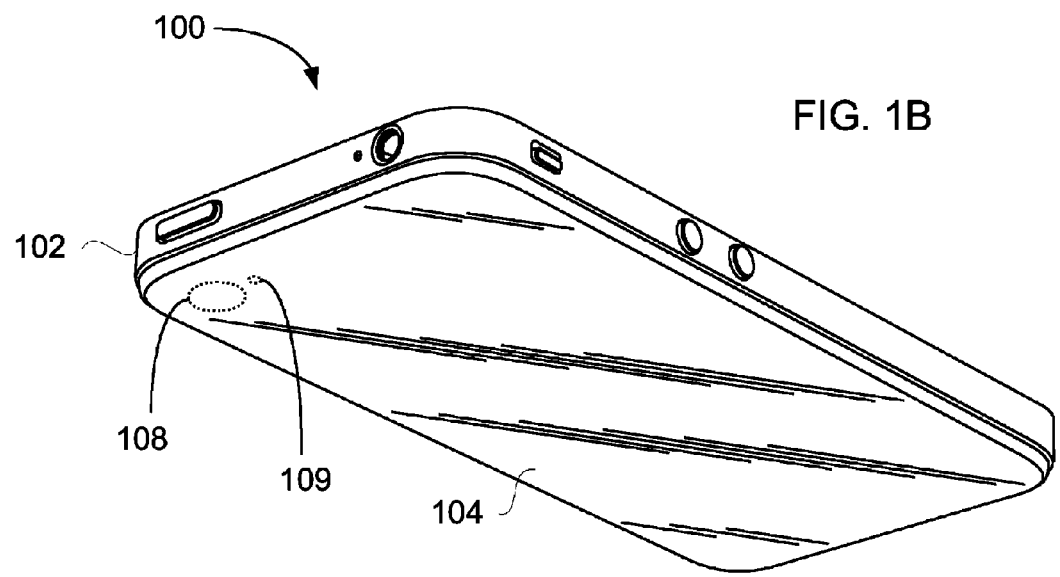

FIGS. 1A and 1B are isometric views of an exemplary portable electronic device 100, for disassembly using one embodiment. As show in the figures, the portable electronic device 100 may comprise a frame member 102 for housing and supporting components of the portable electronic device. The frame member 102 may comprises an inner mid-plate member (not visible in the isometric view of FIGS. 1A and 1B) and a frame band 102, which may be coupled proximate to a perimeter of the inner mid-plate member.

As particularly shown in FIG. 1A, the portable electronic device 100 may comprise a top cover 103 of translucent glass or plastic, which may cover a touch panel arranged over a display of the portable electronic device, for use and viewing by a user of the portable electronic device 100. The portable electronic device 100 may further comprise a bottom cover 104 of translucent glass or plastic, which may cover a camera assembly 108 and a light emitting diode (LED) flash unit 109.

The portable electronic device 100 shown in FIG. 1B is generally similar to the portable electronic device 100 just discussed in detail with respect to FIG. 1A. However, a careful comparison of FIGS. 1A and 1B reveals that the top cover 103 of the portable electronic device 100 shown in FIG. 1A is shown as already removed from the portable electronic device 100 in FIG. 1B. The top cover 103 may be removed from the portable electronic device 100 prior to removing the bottom cover 104 of the portable electronic device. However, such removal of the top cover 103 from the portable electronic device 100 prior to removing the bottom cover 104 of the portable electronic device may not be strictly necessary. Nevertheless, for ease of illustration in subsequent discussions herein, with respect to disassembly of the portable electronic device 100 to remove the bottom cover 104 of the portable electronic device, the top cover 103 of the portable electronic device 100 is treated as having already been removed.

Figure 1C:
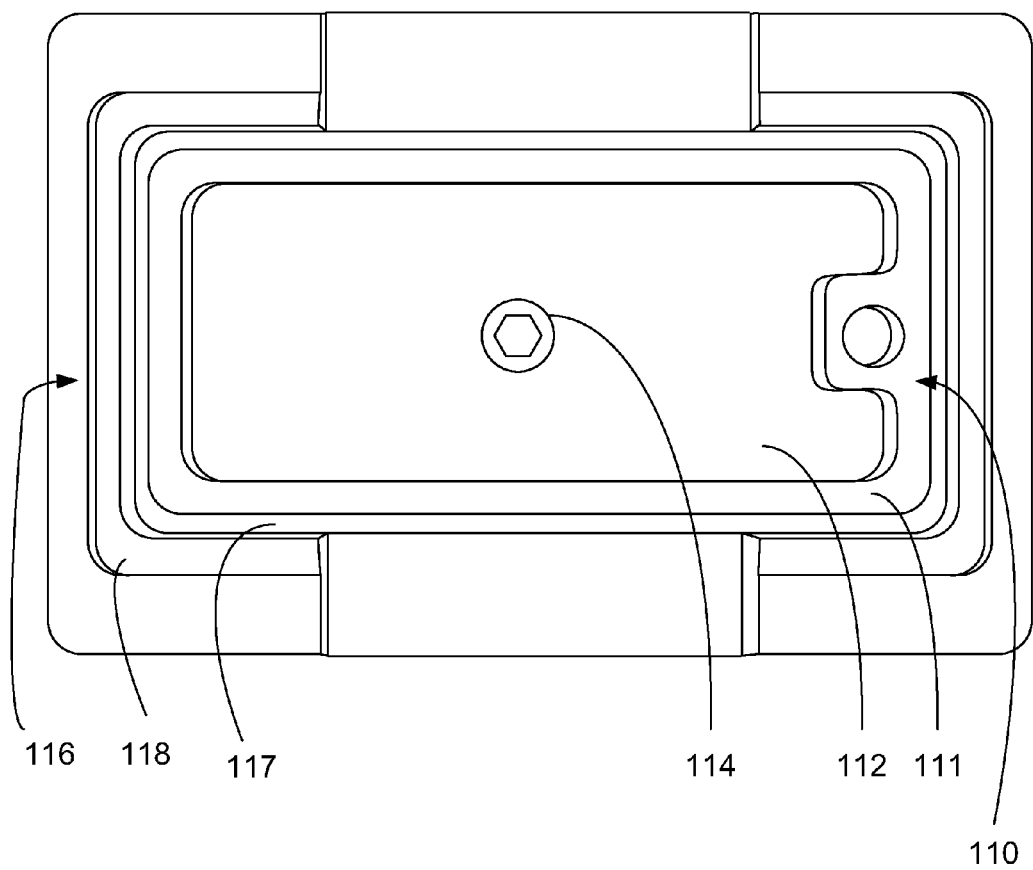
FIG. 1C is a plan view of fixtures of one embodiment, for use in disassembly of the exemplary portable electronic device shown in FIGS. 1A and 1B.

FIG. 1C is a plan view of fixtures 110, 116 of one embodiment, for use in disassembly of the exemplary portable electronic device 100 shown in FIGS. 1A and 1B. The fixtures 110, 116 may comprise a first fixture 110 for releasable securing to the cover (i.e. bottom cover) of the portable electronic device, which was just discussed. In particular, the first fixture 110 for releasable securing to the cover may comprise a vacuum fixture 110, which may have a rubberized surface 111 for provide a substantially vacuum tight seal between the cover and vacuum plate 112; and may further comprise vacuum orifice 114, which may be arranged for securing a vacuum hose to the first fixture 110, and may provide for controllable and/or releasable suction to the first fixture 110.

As shown in FIG. 1C, fixtures 110, 116 may further comprise companion fixture 116 for engaging the frame member of the portable electronic device. The companion fixture 116 may have a central aperture 117 extending there through, for receiving the first fixture 110. The first fixture 110 may be concentrically arranged with respect to the companion fixture 116, as shown in FIG. 1C.

As shown in FIG. 1C, the companion fixture 116 may be particularly adapted for engaging the frame band of the frame member of the portable electronic device. Of particular note in this regard, companion fixture 116 may have a lowered ledge feature 118 (e.g. engagement member 118) as shown in FIG. 1C.

FIGS. 2A-2D are a series of partial block diagrams and simplified side views illustrating disassembly of the portable electronic device using fixtures according to one embodiment. As shown in FIGS. 2A-2D, the apparatus for disassembling cover 204 from frame member 202 of portable electronic device 200 may comprise first fixture 210, which may have rubberized surface 211, for releasable securing to the cover 204; and may further comprise companion fixture 216 for engaging the frame member of the portable electronic device at lowered ledge feature 218 of the companion fixture 216. Since the companion fixture 216 obscures view of the lowered ledge feature 218, the lowered ledge feature 218 is depicted in the figures using phantom/dashed lines.

The first fixture 210 may be concentrically arranged with respect to the companion fixture 216, as shown in FIGS. 2A-2D. In such arrangement, view of the first fixture 210 may be obscured by the companion fixture 216. Accordingly, in the figures the first fixture 210 or obscured portions thereof are depicted using phantom/dashed lines. Similarly, in the figures the portable electronic device 200, or obscured portions thereof are likewise depicted using phantom/dashed lines.

The portable electronic device 200 may have been assembled using adhesive bonding material 205, 207 between the frame member 202 and cover 204 of the portable electronic device 200. As a general matter, such adhesive bonding material 205, 207 is arranged internally to the electronic device, so as not to be visible in the side views of the figures. However, for ease of illustration in the figures, the adhesive bonding material 205, 207 is representatively illustrated in the figures by two small circles 205, 207. As will be discussed in greater detail subsequently herein, adhesive bonding material 205, 207 may provide adhesive bonds between the frame member 202 and cover 204, which may be broken in disassembly of the portable electronic device as illustrated in the series of FIGS. 2A-2D. In particular, there may be breaking of a proximate adhesive bond provided by bonding material located between the cover 204 and the frame member 202 and located proximate to corresponding extremities of the cover 204 and the frame member 202, as shown in the figures. Similarly, there may be breaking of a distal adhesive bond provided by bonding material 207 located between the cover 204 and the frame member and located remote from the aforementioned corresponding extremities of the cover 204 and the frame member 202. In other words, there may be breaking of the proximate adhesive bond, which may be disposed near one end of the portable electronic device, and there may also be breaking of the distal adhesive bond, which may be remotely arranged, for example near, an opposing end of the portable electronic device 200.

As shown in FIGS. 2A-2D, the apparatus may further comprise vacuum unit 219 for providing controllable and releasable suction to the first fixture 210, which may be coupled thereto using a vacuum hose. The apparatus may further comprise a guide member 220, which may be coupled with the first fixture 210 and the companion fixture 216 for guiding relative movement between the first fixture 210 and the companion fixture 216 in disassembling the cover 204 from the frame member 202 of the portable electronic device 200.

Figure 2A:
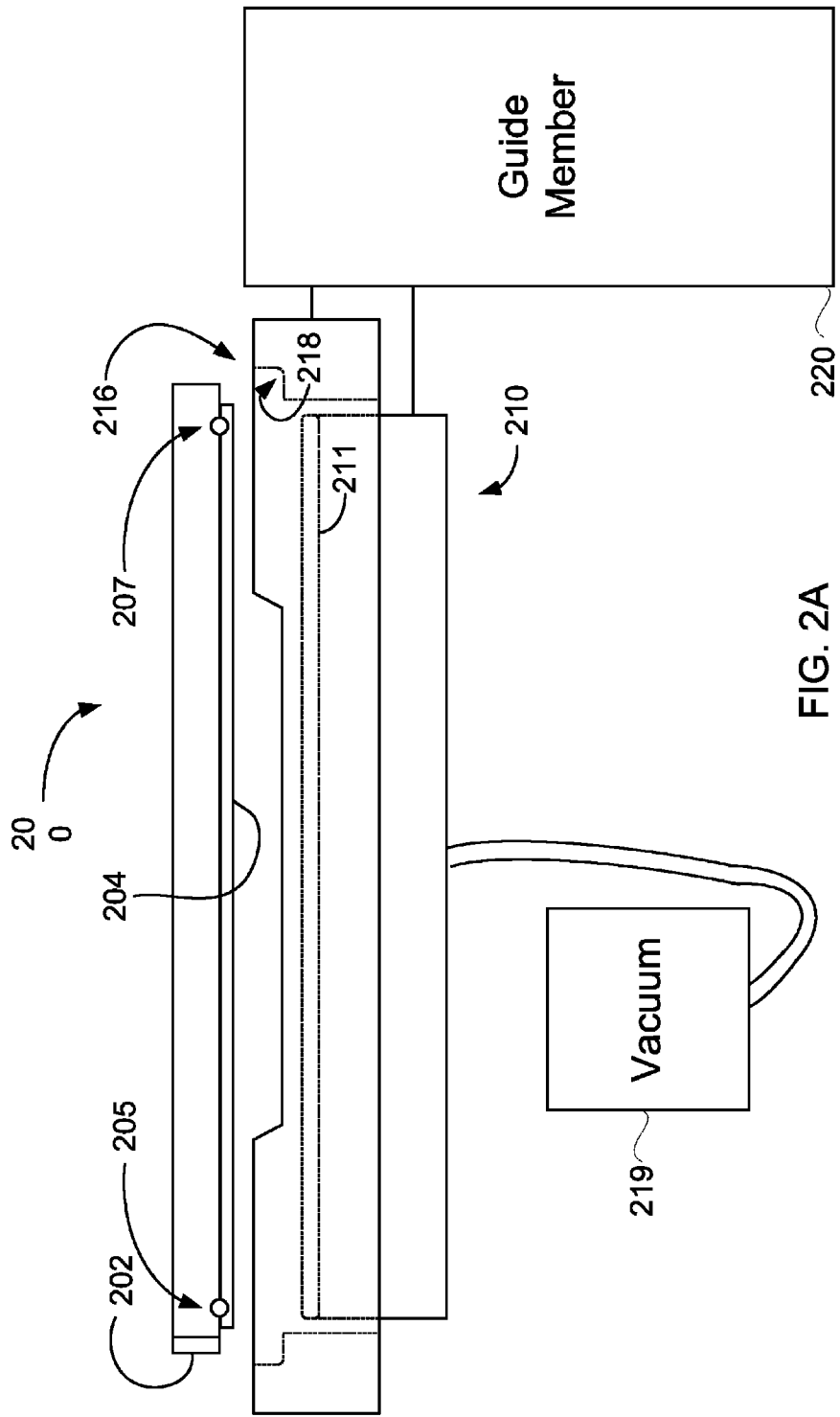
FIGS. 2A-2D are a series of partial block diagrams and simplified side views illustrating disassembly of the portable electronic device using fixtures according to one embodiment.
Figure 2B:
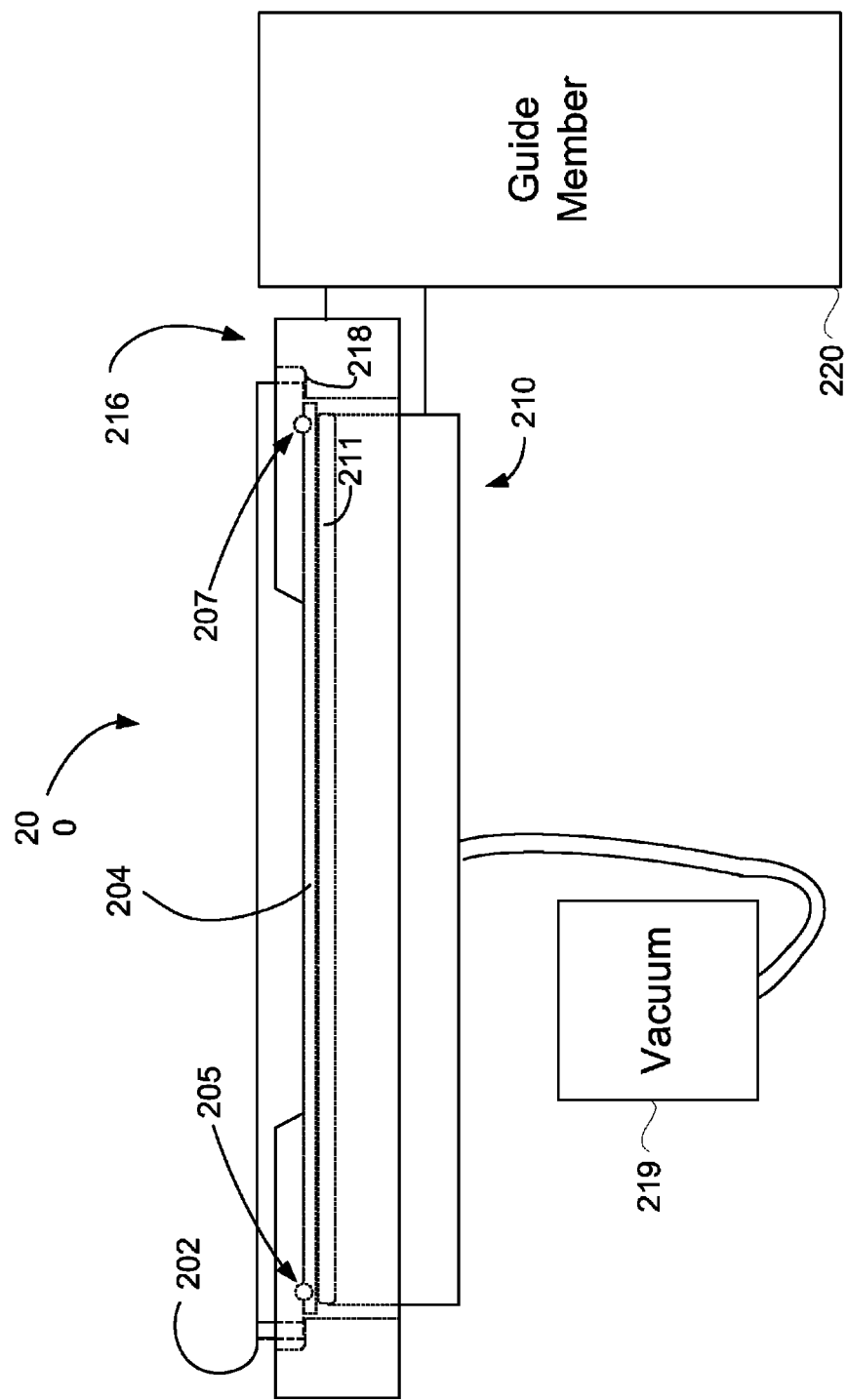

In the series of FIGS. 2A-2D illustrating disassembly, FIG. 2A first shows the electronic device 200 suspended above the fixtures 210, 216. Next, FIG. 5B shows the fixtures 210, 216 receiving the portable electronic device 200. Lowered ledge feature 218 of the companion fixture 216 may engage the frame band 202 as shown in FIG. 5B. Suction of vacuum unit 219 may be activated for releasable securing of the first fixture 210 to the cover 204. The rubberized surface 211 of the first fixture 210 may provide a substantially vacuum tight seal.

Figure 2C:
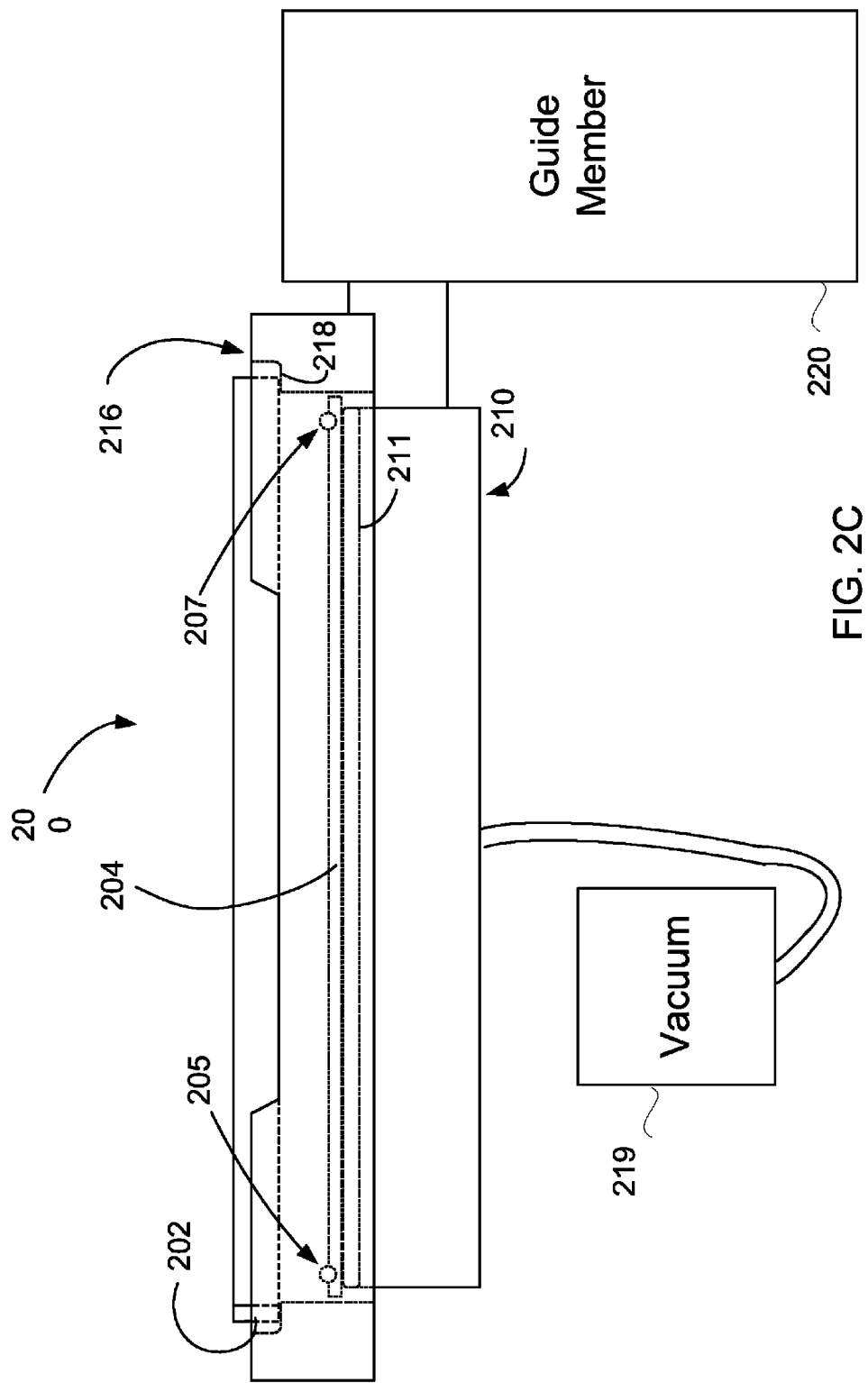

Next FIG. 2C shows the result of movement, which may be relative movement between the first fixture 210 and the companion fixture 216, which may be guided by guide member 220. The guide member 220 may be arranged with the first fixture 210 and the companion fixture 216 for allowing the cover 204 to be pulled from the frame member 202 of the portable electronic device 200. Careful review of differences between FIGS. 5B and 2C reveals that the aforementioned adhesive bonds may be broken as the cover 204 is separated from the frame member 202. In other words, as the cover 204 is separated from the frame member 202, there may be breaking of the proximate adhesive bond of bonding material 205, which may be disposed near one end of the portable electronic device, and there may also be breaking of the distal adhesive bond of bonding material, which may be remotely arranged, for example near, the opposing end of the portable electronic device 200. As representatively illustrated in FIGS. 2C and 2D, after the adhesive bonds are broken, all or substantially all or a significant portion of the bonding material 205, 207 may remain with the cover 204.

Figure 2D:
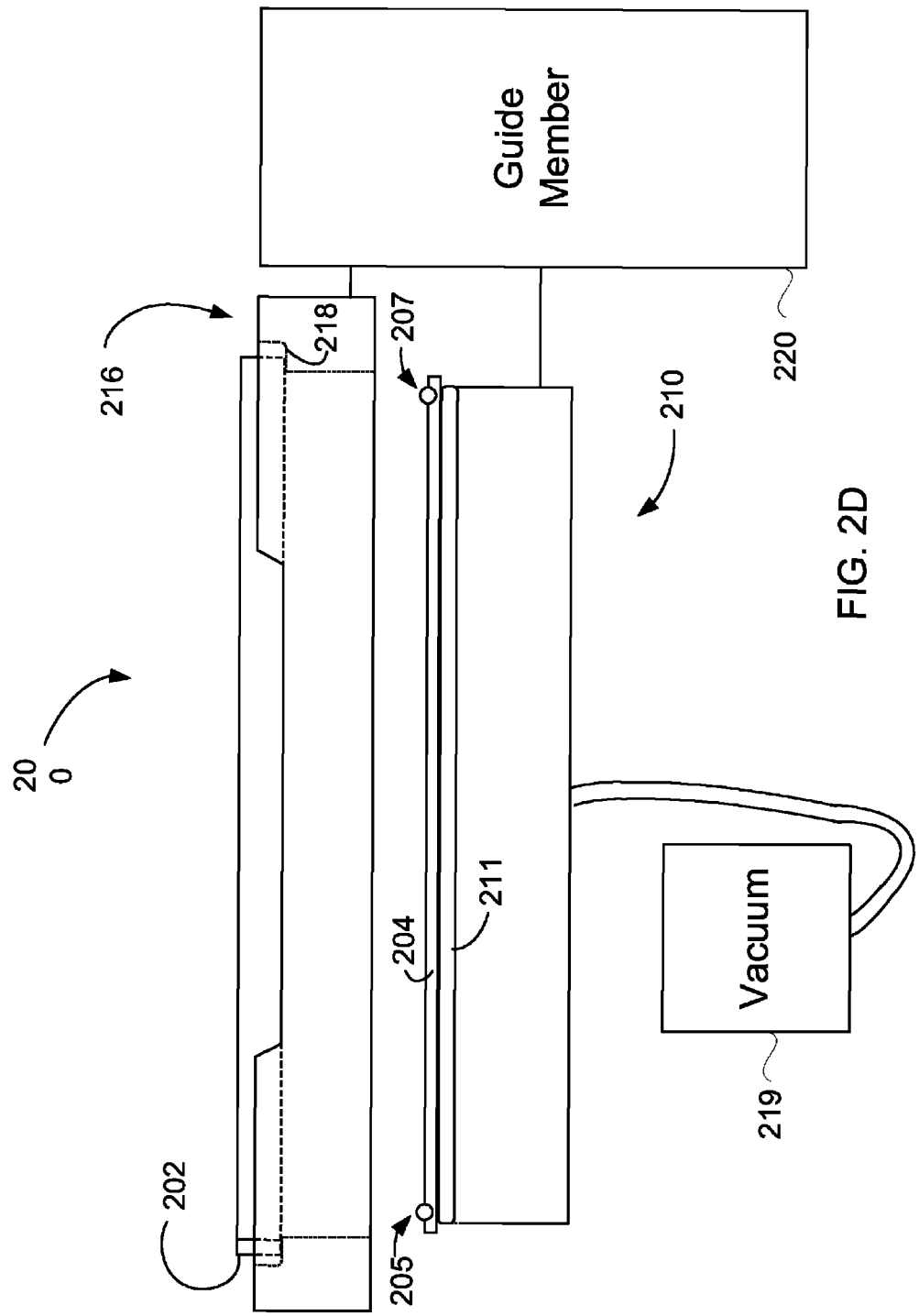

Next, FIG. 2D shows the result of further movement, which may be relative movement between the first fixture 210 and the companion fixture 216, which may be guided by guide member 220. The first fixture 210 may be fully withdrawn from the companion fixture 216 as shown in FIG. 2D. To provide for retrieval of the cover 204, for example, to provide for re-work of the cover, suction of vacuum unit 219 may be deactivated and cover 204 may be released from the first fixture 210. Similarly, after separation from the cover 204, a remainder portion of the electronic device, specifically frame member 202 and any associated electronic components, may be retrieved from companion fixture 216, for example, to provide for re-work thereof.

Figure 3A:
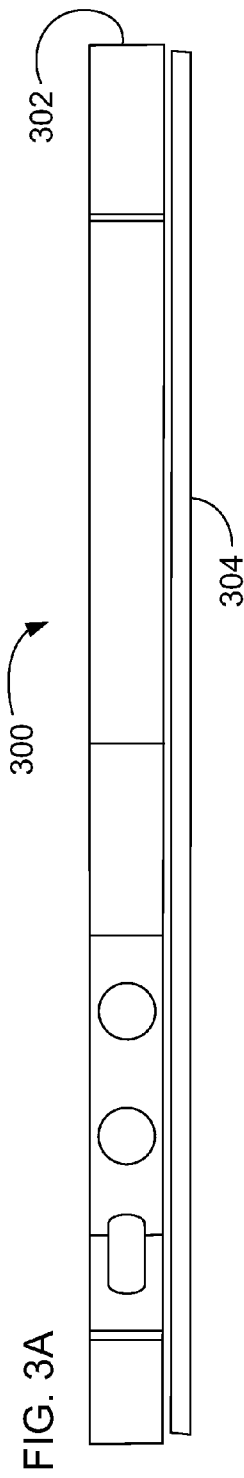
FIGS. 3A-3C are a series of more detailed side views of the portable electronic device, further illustrating the disassembly of the portable electronic device that is shown in FIGS. 2A-2D.
Figure 3B:
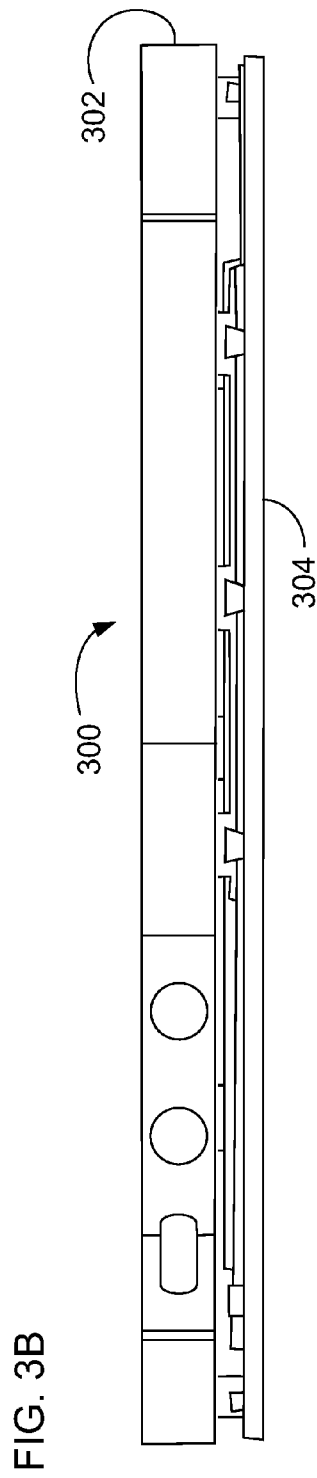
Figure 3C:
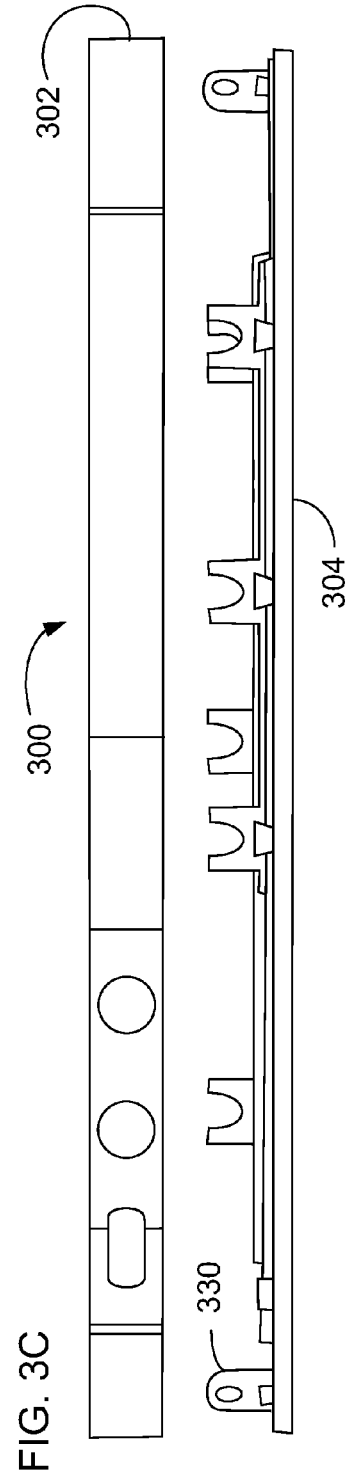

FIGS. 3A-3C are a series of more detailed side views of portable electronic device 300, further illustrating the disassembly of the portable electronic device as shown in FIGS. 2A-2D, which was just discussed. As shown greater detail in FIGS. 3A-3C, the cover discussed previously may comprise a cover glass assembly 304 having one or more assembly tabs 330 extending there from. In progressive sequence, FIGS. 3A and 3B and 3B show progressive separation of cover assembly 304 from frame member 302, in accordance with disassembly using the fixtures as previously discussed with respect to FIGS. 2A-2D.

Figure 4A:
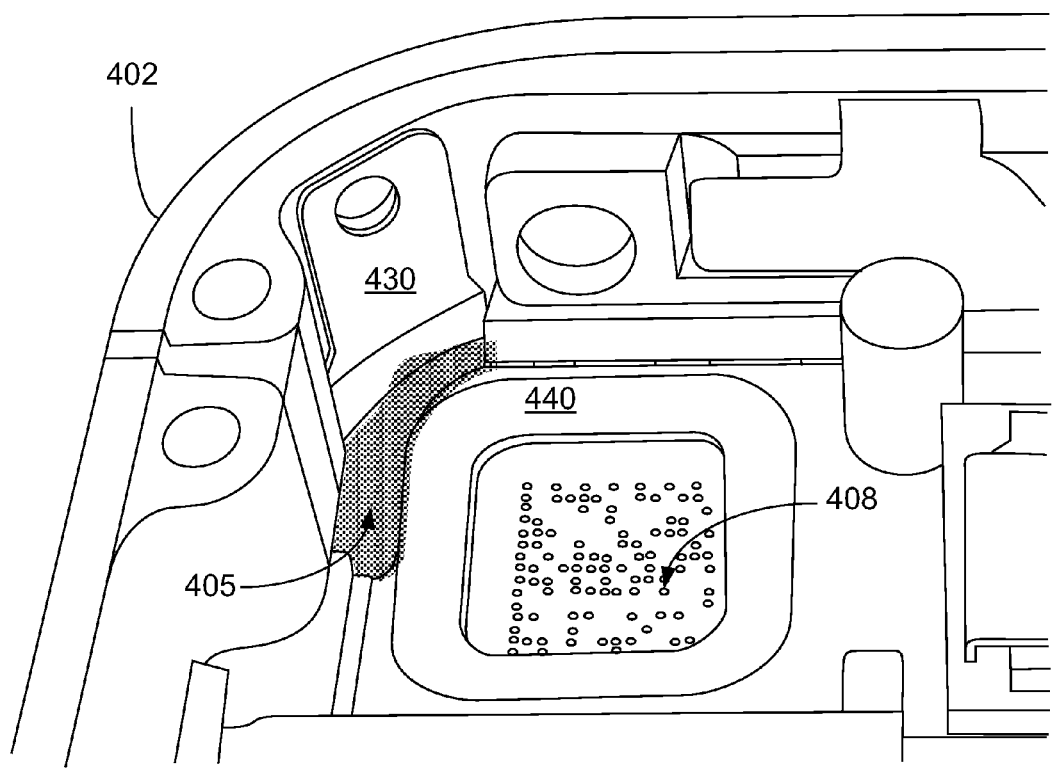
FIGS. 4A-4D are a series of even more detailed views of the portable electronic device, further illustrating the disassembly of the portable electronic device that is shown in FIGS. 2A-2D.

FIGS. 4A-4D are a series of even more detailed views of the portable electronic device, further illustrating the disassembly of the portable electronic device that is shown in FIGS. 2A-2D. First, an interior view of FIG. 4A of frame member 402 shows adhesive bonding material 405 of the previously discussed proximate adhesive bond between tab 430 of the cover glass assembly and frame member 402. The adhesive bonding material is highlighted in the figures using stippling. Inner mid-plate 440 of the frame member 402 may comprise metal, which may be over molded with plastic and coupled with band 402 about a perimeter of the inner mid-plate 440. As shown in FIG. 4A, the inner mid-plate 440 of the frame member may have one or more apertures extending there through. In some of the figures, a back surface of a camera assembly 408 is visible through one of the apertures.

Figure 4B:
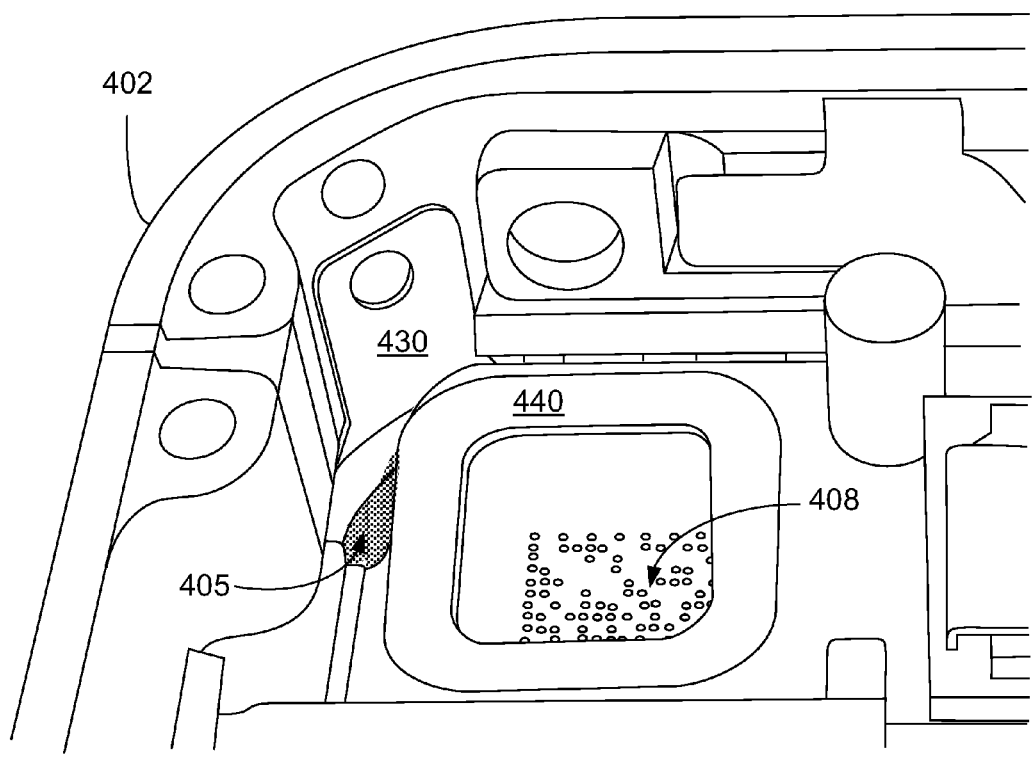

Next, FIG. 4B shows partial withdrawal of the tab 430 of the cover glass assembly, as the cover glass assembly begins separating from the frame member 402 in accordance with partial disassembly using the fixtures as previously discussed with respect to FIGS. 2A-2D.

Figure 4C:
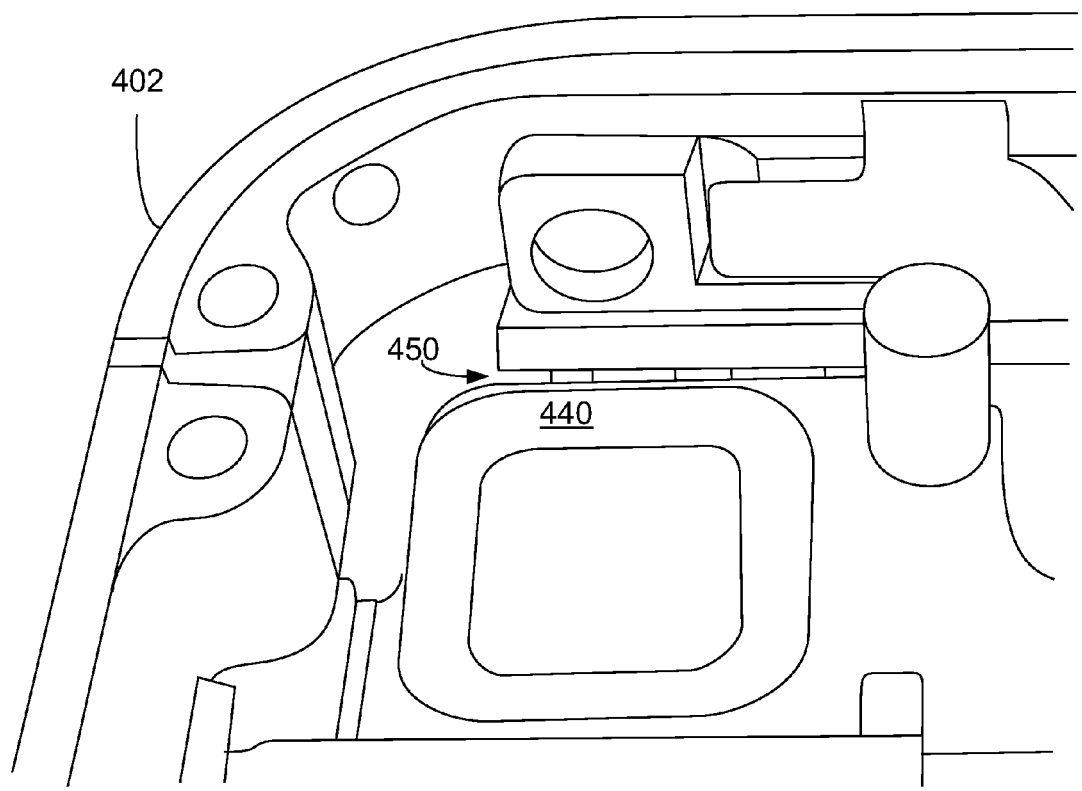
Figure 4D:
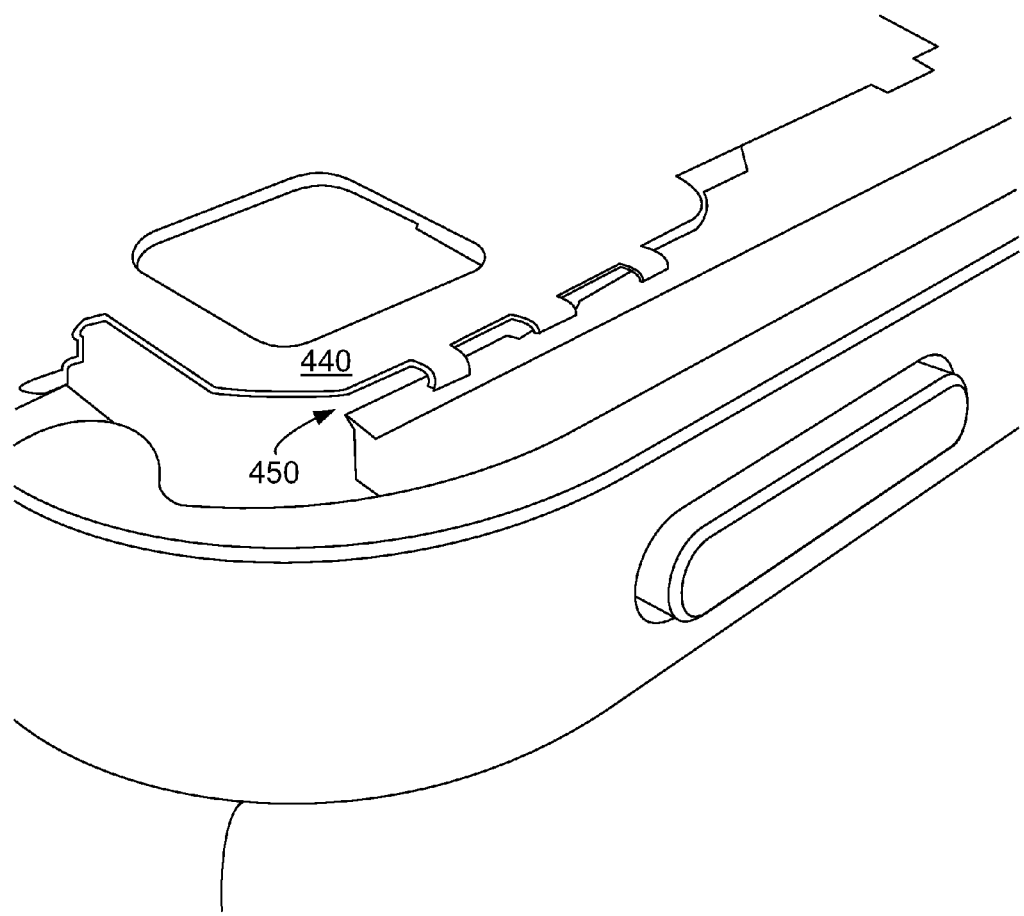

Next, FIGS. 4C and 4D show alternative inner and outer views of the frame member 402, after full separation of the cover glass assembly and complete disassembly using the fixtures as previously discussed with respect to FIGS. 2A-2D. In some cases, excessive force may be used in separation.

Excessive force applied to the inner mid-plate of the frame member during separation of the cover assembly from may result in substantial damage 450 as shown in FIGS. 4C and 4D. Damage 450 may be seen in FIGS. 4C and 4D as possible de-lamination or possible undesired separation of the metal of the inner mid-plate 440 of the frame member from the aforementioned over molded plastic of the frame member 402. Gap 450 shown in FIGS. 4C and 4D illustrates such damage to frame member 402

As the aforementioned proximate and distal adhesive bonds are broken, the fixtures discussed previously herein with respect to FIGS. 2A-2D may allow application of excessive force, for example, to the proximate adhesive bond of bonding material 405, which may in turn apply excessive force to the inner mid-plate 440 of the frame member 402, which may cause damage 450. As will be discussed subsequently herein, such force may be limited in other embodiments, which may limit such damage.

FIGS. 5A-5D are a series of partial block diagrams and simplified side views illustrating disassembly of portable electronic device 500 using fixtures 510, 516 according to another embodiment. As shown in FIGS. 5A-5D, the apparatus for disassembling cover 504 from frame member 502 of portable electronic device 500 may comprise first fixture 510, which may have rubberized surface 511, for releasable securing to the cover 504; and may further comprise companion fixture 516 for engaging the frame member of the portable electronic device at lowered ledge feature 518 of the companion fixture 516. Since the companion fixture 516 obscures view of the lowered ledge feature 518, the lowered ledge feature 518 is depicted in the figures using phantom/dashed lines.

The first fixture 510 may be concentrically arranged with respect to the companion fixture 516, as shown in FIGS. 5A-5D. In such arrangement, view of the first fixture 510 may be obscured by the companion fixture 516. Accordingly, in the figures the first fixture 510 or obscured portions thereof are depicted using phantom/dashed lines. Similarly, in the figures the portable electronic device 500, or obscured portions thereof are likewise depicted using phantom/dashed lines.

The portable electronic device 500 may have been assembled using adhesive bonding material 505, 507 between the frame member 502 and cover 504 of the portable electronic device 500. As mentioned previously herein, such adhesive bonding material 505, 507 is typically arranged internally to the electronic device, so as not to be visible in the side views of the figures. However, for ease of illustration in the figures, the adhesive bonding material 505, 507 is representatively illustrated in the figures by two small circles 505, 507.

As shown in FIGS. 5A-5D, the apparatus may further comprise vacuum unit 519 for providing controllable and releasable suction to the first fixture 510, which may be coupled thereto using a vacuum hose. The apparatus may further comprise a guide member 520, which may be coupled with the first fixture 510 and the companion fixture 516 for guiding relative movement between the first fixture 510 and the companion fixture 516 in disassembling the cover 504 from the frame member 502 of the portable electronic device 500.

Figure 5A:
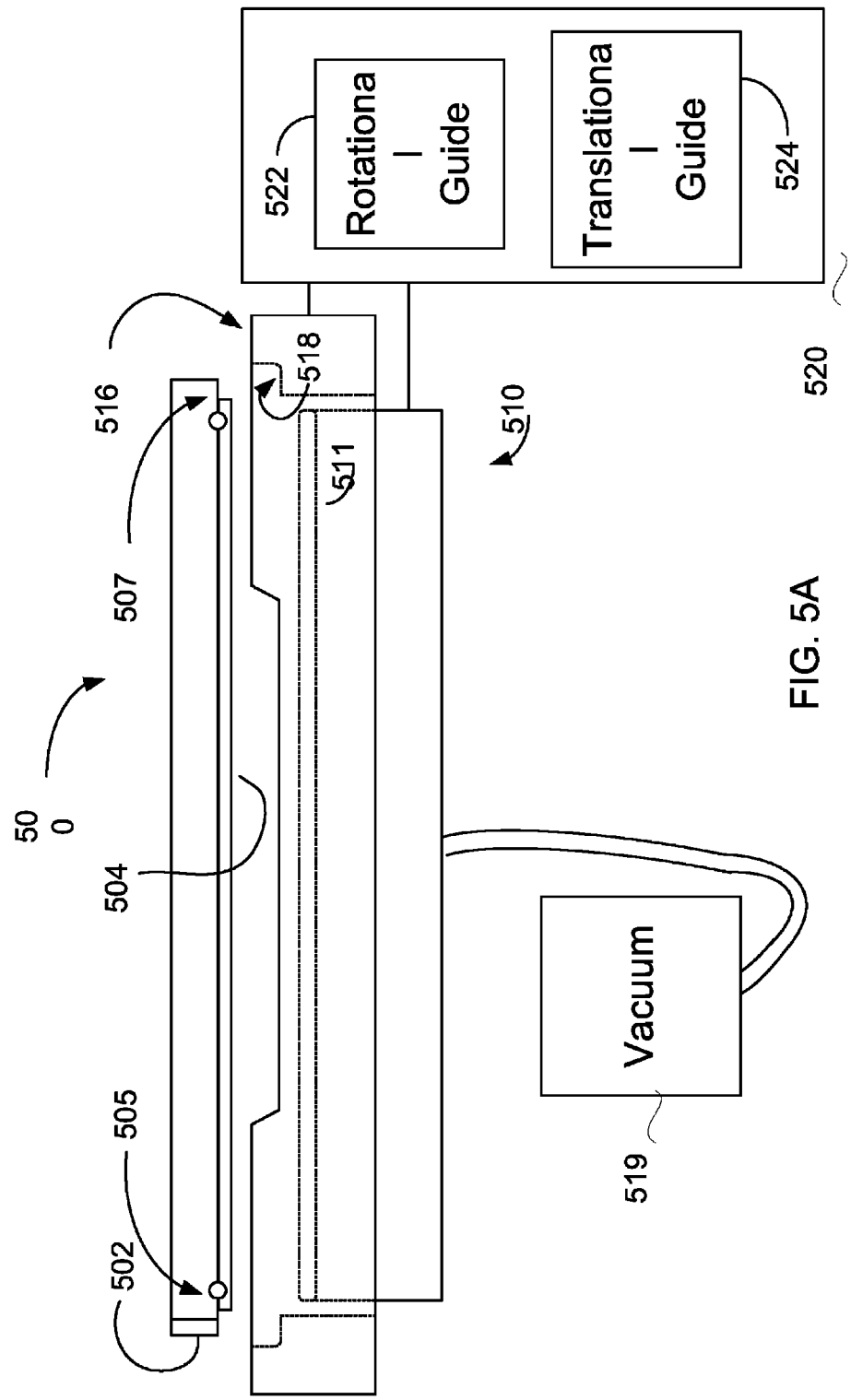
Figure 5B:
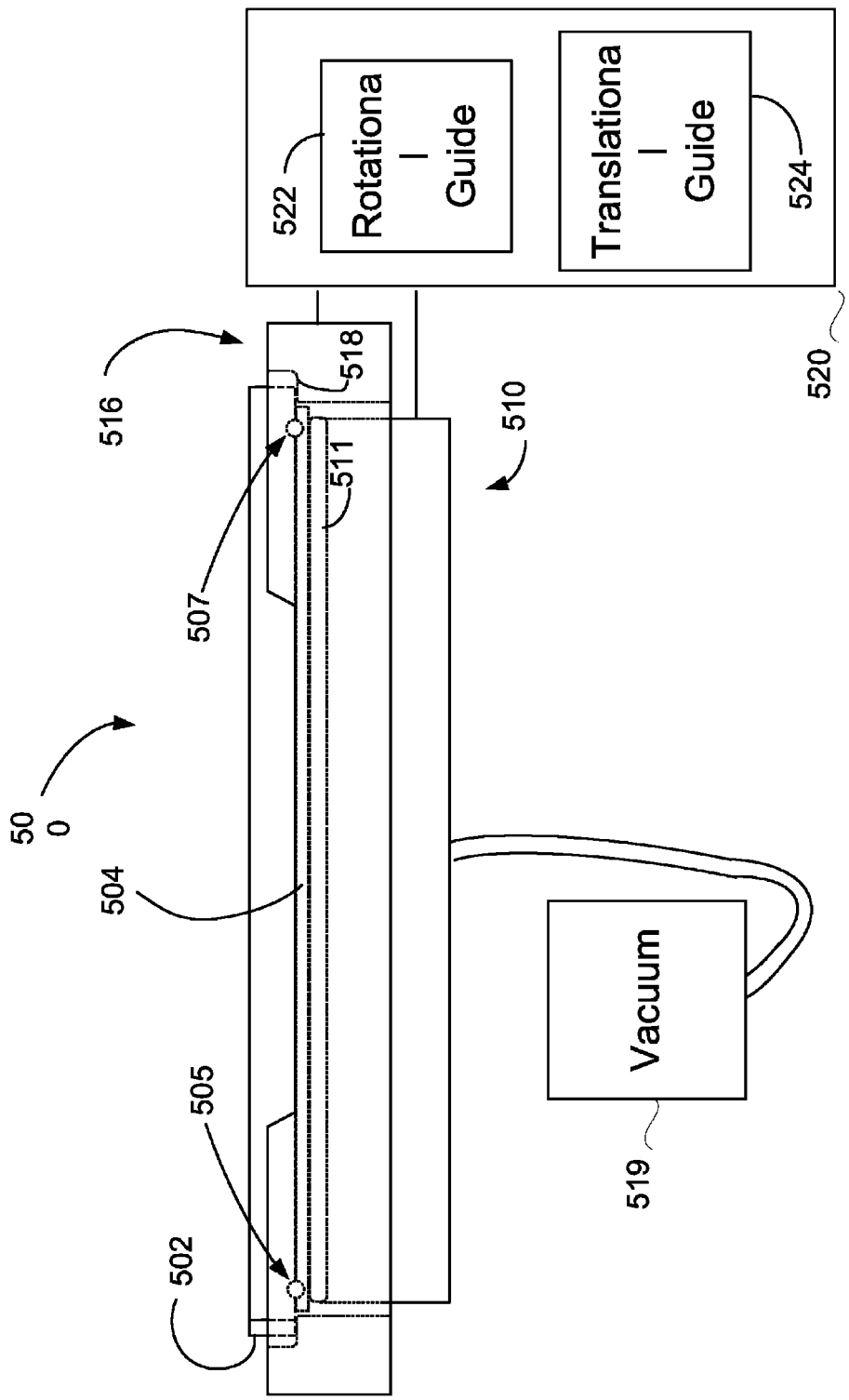

In the series of FIGS. 5A-5D illustrating disassembly, FIG. 5A first shows the portable electronic device 500 suspended above the fixtures 510, 516. Next, FIG. 5B shows the fixtures 510, 516 receiving the portable electronic device 500. Lowered ledge feature 518 of the companion fixture 516 may engage the frame band 502 as shown in FIG. 5B. Suction of vacuum unit 519 may be activated for releasable securing of the first fixture 510 to the cover 504. The rubberized surface 511 of the first fixture 510 may provide a substantially vacuum tight seal.

Next FIG. 5C shows the result of movement, which may be relative rotational movement between the first fixture 510 and the companion fixture 516, and which may be guided by a rotational guide member 522 of guide member 520. As shown in FIG. 5C, the rotational guide member 522 may be arranged for guiding relative rotational movement between the cover 504 and the frame member 502 about a pivot point, which may be proximate to extremities of the cover 504 and the frame member 502. In particular, as shown in FIG. 5C, the rotational guide member 522 may be arranged for guiding relative rotational movement between the cover and the frame member about such pivot point, which may be located adjacent to a proximate adhesive bond of bond material 505 between the cover 504 and the frame member 502, so as to substantially limit force applied to the proximate adhesive bond of bond material 505.

Limiting force applied to the proximate adhesive bond of bonding material 505, may in turn limit force applied to inner mid-plate of the frame member 502, which may substantially limit damage to inner mid-plate of the frame member 502. In other words, rotational guide member 522 may be arranged for guiding relative rotational movement between the cover 504 and the frame member 502 about such pivot point located adjacent to proximate adhesive bond of bonding material 505 between the cover 504 and the plate member of the frame member 502, so as to substantially limit force applied to the inner mid-plate of the frame member 502.

Careful review of differences between FIGS. 5B and 5C illustrates that limiting applied force at proximate adhesive bond of bonding material 505 may limit changes to the proximate adhesive bond, while sufficient force may be applied to the distal adhesive bond of bonding material 507 for breaking the distal bond. In other words, by guiding the rotation, applied force may be sufficiently limited so as to avoid breaking the proximate adhesive bond of bonding material 505, which may be disposed near one end of the portable electronic device 500 near the rotation's pivot point, while the rotation may still apply sufficient force for breaking of the distal adhesive bond of bonding material 507, which may be remotely arranged, for example near an opposing end of the portable electronic device 500. In FIG. 5C one end of the cover 504 is shown as not yet separated from the frame member 502, while the opposing end of the cover 504 is already separated from the frame member by the rotation. Accordingly, as shown in FIG. 5C, while limited force may be applied to the proximate adhesive bond of bonding material 505, by relative rotational movement between the first fixture 510 and the companion fixture 516 (guided by a rotational guide member 522 of guide member 520), sufficient force may be applied for breaking the distal adhesive bond of bonding material 507.

Figure 5D:
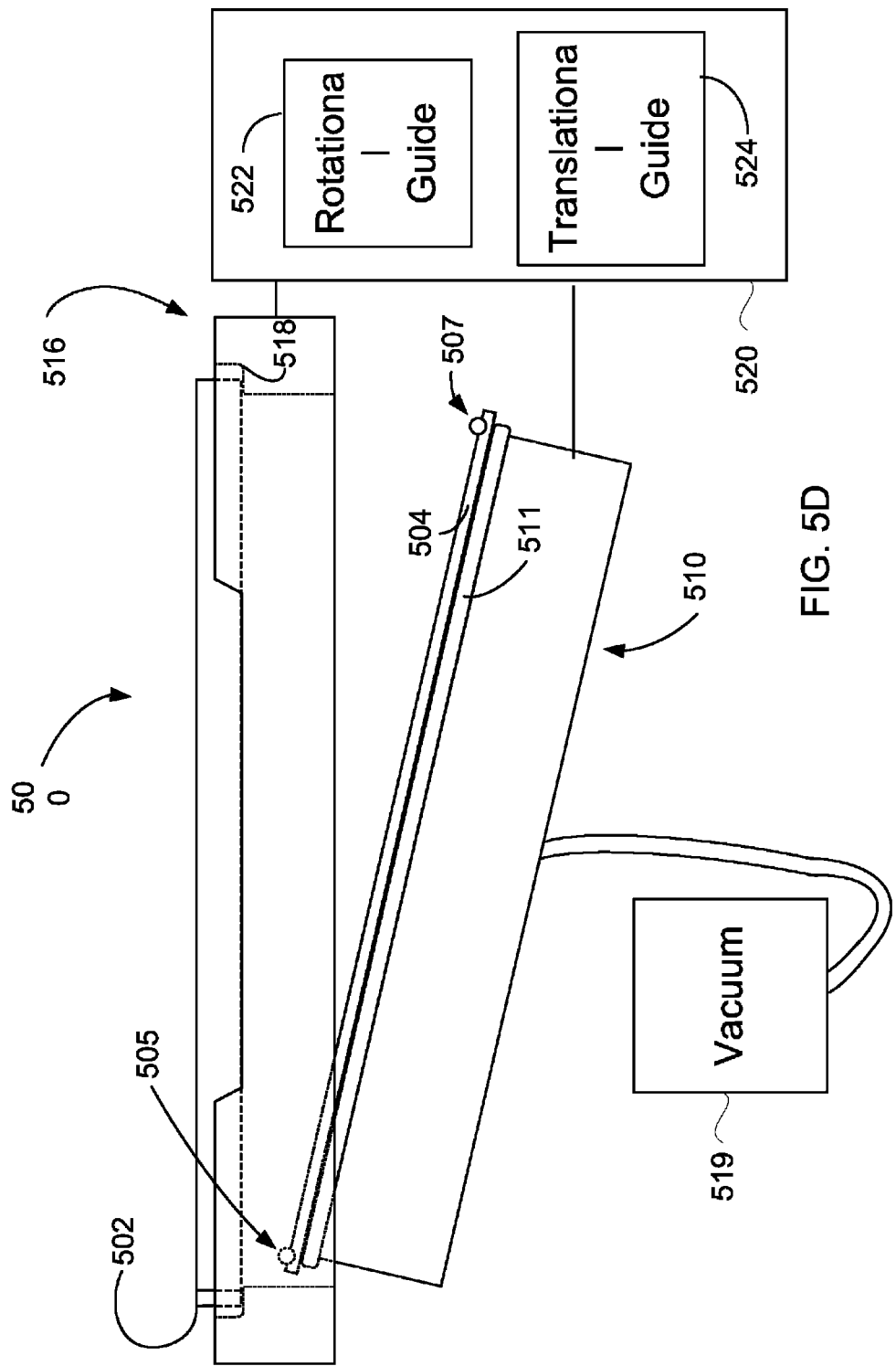

Next, FIG. 5D shows the result of translational movement, which may be relative translational movement between the first fixture 510 and the companion fixture 516, which may be guided by translational guide member 524 of the guide member 520. The translational guide member 524 of guide member 520 may be arranged with the first fixture 510 and the companion fixture 516 for breaking the proximate adhesive bond of bonding material 505 and allowing the cover 504 to be pulled from the frame member 502 of the portable electronic device 500. Relatively more force may have been required, if both proximate and distal adhesive bonds were to have been broken at about the same time. By first breaking the distal bond of bonding material 507 by rotation, and subsequently breaking the proximate bond of bonding material 505 by translation, relatively less force may be needed for breaking the proximate bond of bonding material 505. Limiting force needed for breaking the proximate adhesive bond of bonding material 505 may in turn limit force applied to inner mid-plate of the frame member 502, which may substantially limit damage to inner mid-plate of the frame member 502.

As representatively illustrated in FIGS. 5D, after the adhesive bonds are broken, all or substantially all or a significant portion of the bonding material 505, 507 may remain with the cover 504. Once the cover 504 is separated from the frame member 502 of the electronic device 500, the first fixture 510 may be fully withdrawn from the companion fixture 516. To provide for retrieval of the cover 504, for example, to provide for re-work of the cover, suction of vacuum unit 519 may be deactivated and cover 504 may be released from the first fixture 510. Similarly, after separation from the cover 504, a remainder portion of the electronic device, specifically frame member 502 and any associated electronic components, may be retrieved from companion fixture 516, for example, to provide for re-work thereof.

Figure 6A:
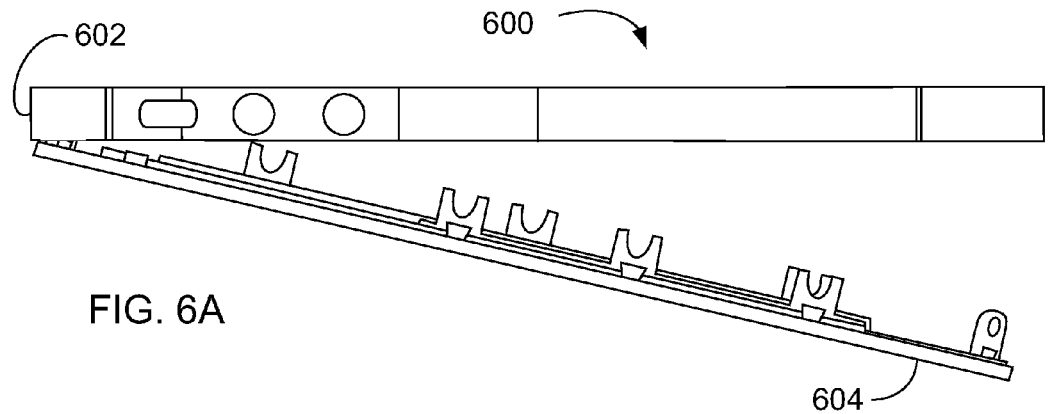
FIGS. 6A and 6B are detailed views of the portable electronic device, further illustrating the disassembly of the portable electronic device that is shown in FIGS. 5A-5D.
Figure 6B:
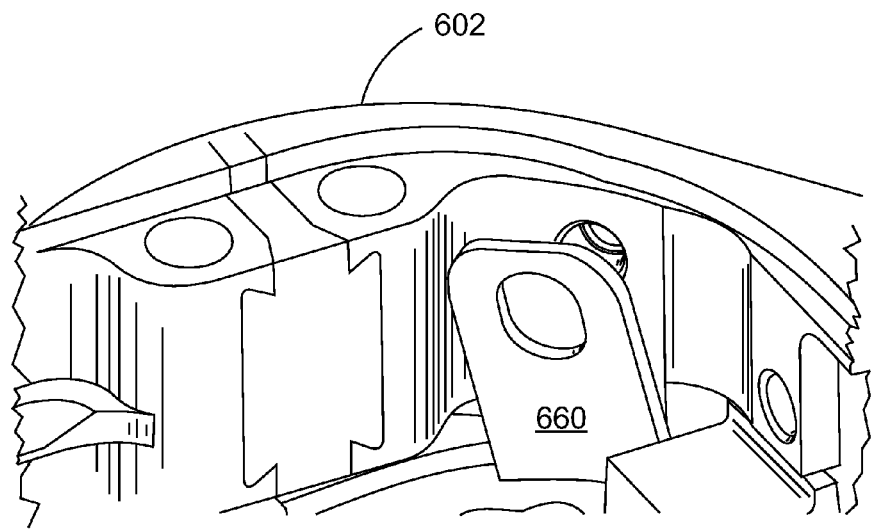

FIGS. 6A and 6B are detailed views of the portable electronic device, further illustrating aspects of the disassembly of the portable electronic device using fixtures as shown in FIGS. 5A-5D and as just discussed. In detailed side view in FIG. 6A, rotation of cover glass assembly 604 is shown relative to frame member 602 of portable electronic device 600 at a limited angle of about thirteen degrees or less.

FIG. 6B is a detailed interior view of frame member 602, showing tilting of tab 660 of the cover glass assembly, resulting from the rotation of the cover glass assembly by the limited angle of about thirteen degrees or less. As shown in FIG. 6B, excessive rotation of the cover glass assembly may cause excessive tilting of tab 660 of the cover glass assembly. With such excessive tilting, the tab 660 may encounter interference with the inner wall of the frame member 602, which may in turn result in application of excessive force to the proximate adhesive bond. Accordingly, by limiting excessive rotation, force to the proximate adhesive bond may be limited.

FIGS. 7A-7D are a series of partial block diagrams and simplified side views illustrating disassembly of the portable electronic device using fixtures 710, 716 according to yet another embodiment. As shown in FIGS. 7A-7D, the apparatus for disassembling cover 704 from frame member 702 of portable electronic device 700 may comprise first fixture 710, which may have rubberized surface 711, for releasable securing to the cover 704; and may further comprise companion fixture 716 for engaging the frame member of the portable electronic device at lowered ledge feature 718 of the companion fixture 716. Since the companion fixture 716 obscures view of the lowered ledge feature 718, the lowered ledge feature 718 is depicted in the figures using phantom/dashed lines.

The first fixture 710 may be concentrically arranged with respect to the companion fixture 716, as shown in FIGS. 7A-7D. In such arrangement, view of the first fixture 710 may be obscured by the companion fixture 716. Accordingly, in the figures the first fixture 710 or obscured portions thereof are depicted using phantom/dashed lines. Similarly, in the figures the portable electronic device 700, or obscured portions thereof are likewise depicted using phantom/dashed lines.

The portable electronic device 700 may have been assembled using adhesive bonding material 705, 707 between the frame member 702 and cover 704 of the portable electronic device 700. As mentioned previously herein, such adhesive bonding material 705, 707 is typically arranged internally to the electronic device, so as not to be visible in the side views of the figures. However, for ease of illustration in the figures, the adhesive bonding material 705, 707 is representatively illustrated in the figures by two small circles 705, 707.

As shown in FIGS. 7A-7D, the apparatus may further comprise vacuum unit 719 for providing controllable and releasable suction to the first fixture 710, which may be coupled thereto using a vacuum hose. The apparatus may further comprise a guide member 720, which may be coupled with the first fixture 710 and the companion fixture 716 for guiding relative movement between the first fixture 710 and the companion fixture 716 in disassembling the cover 704 from the frame member 702 of the portable electronic device 700.

Figure 7A:
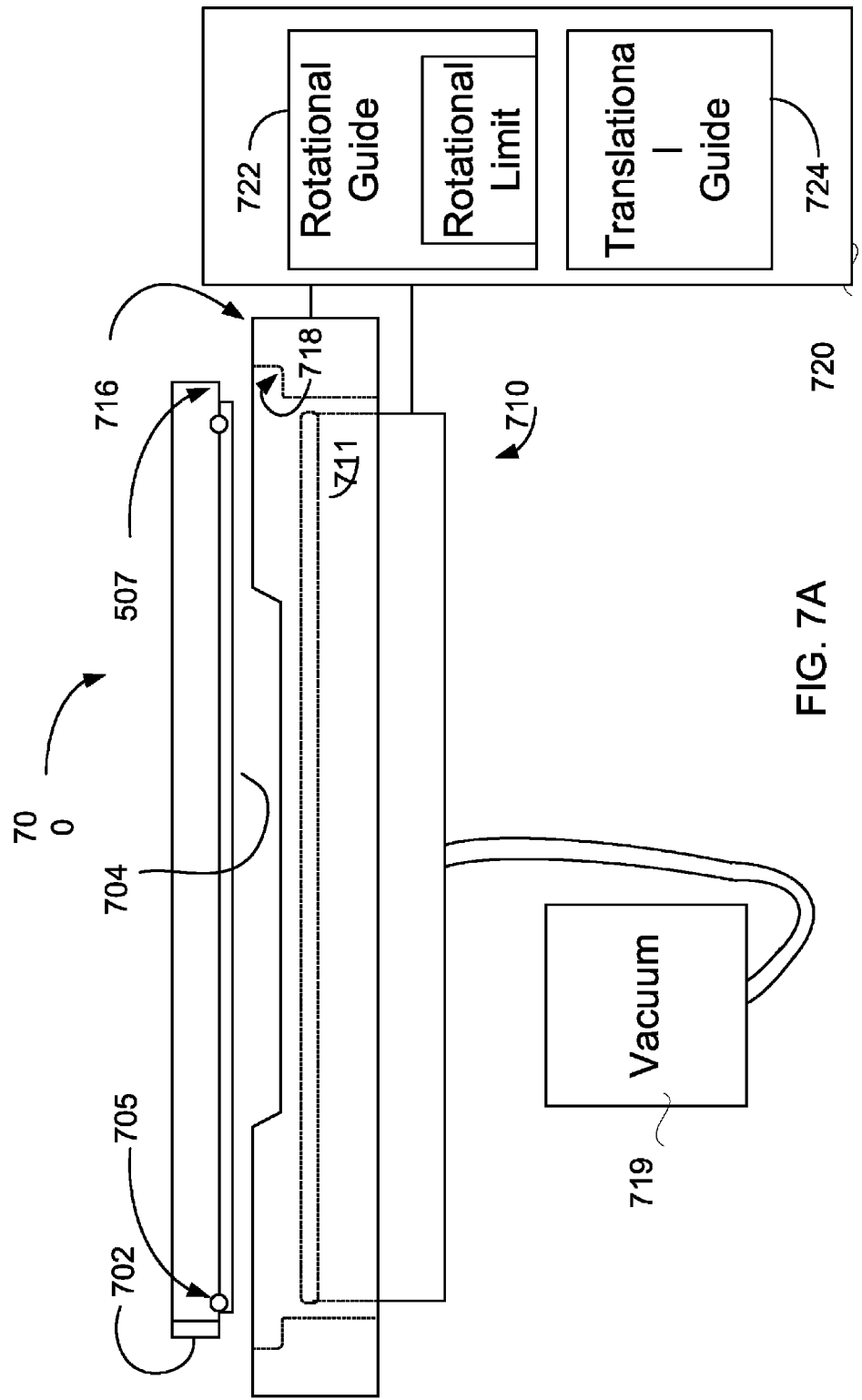
FIGS. 7A-7D are a series of partial block diagrams and simplified side views illustrating disassembly of the portable electronic device using fixtures according to yet another embodiment.
Figure 7B:
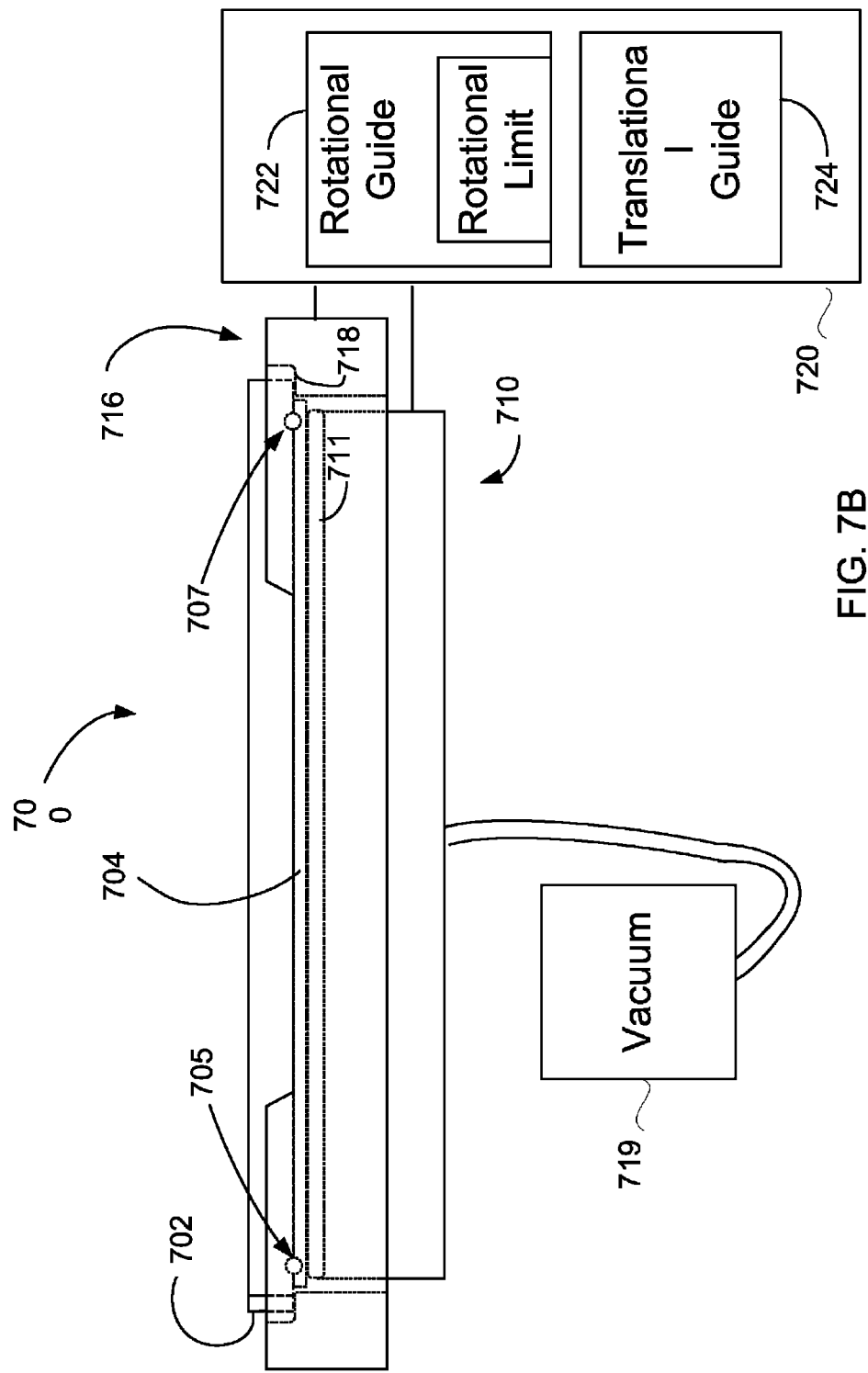

In the series of FIGS. 7A-7D illustrating disassembly, FIG. 7A first shows the portable electronic device 700 suspended above the fixtures 710, 716. Next, FIG. 7B shows the fixtures 710, 716 receiving the portable electronic device 700. Lowered ledge feature 718 of the companion fixture 716 may engage the frame band 702 as shown in FIG. 7B. Suction of vacuum unit 719 may be activated for releasable securing of the first fixture 710 to the cover 704. The rubberized surface 711 of the first fixture 710 may provide a substantially vacuum tight seal.

Figure 7C:
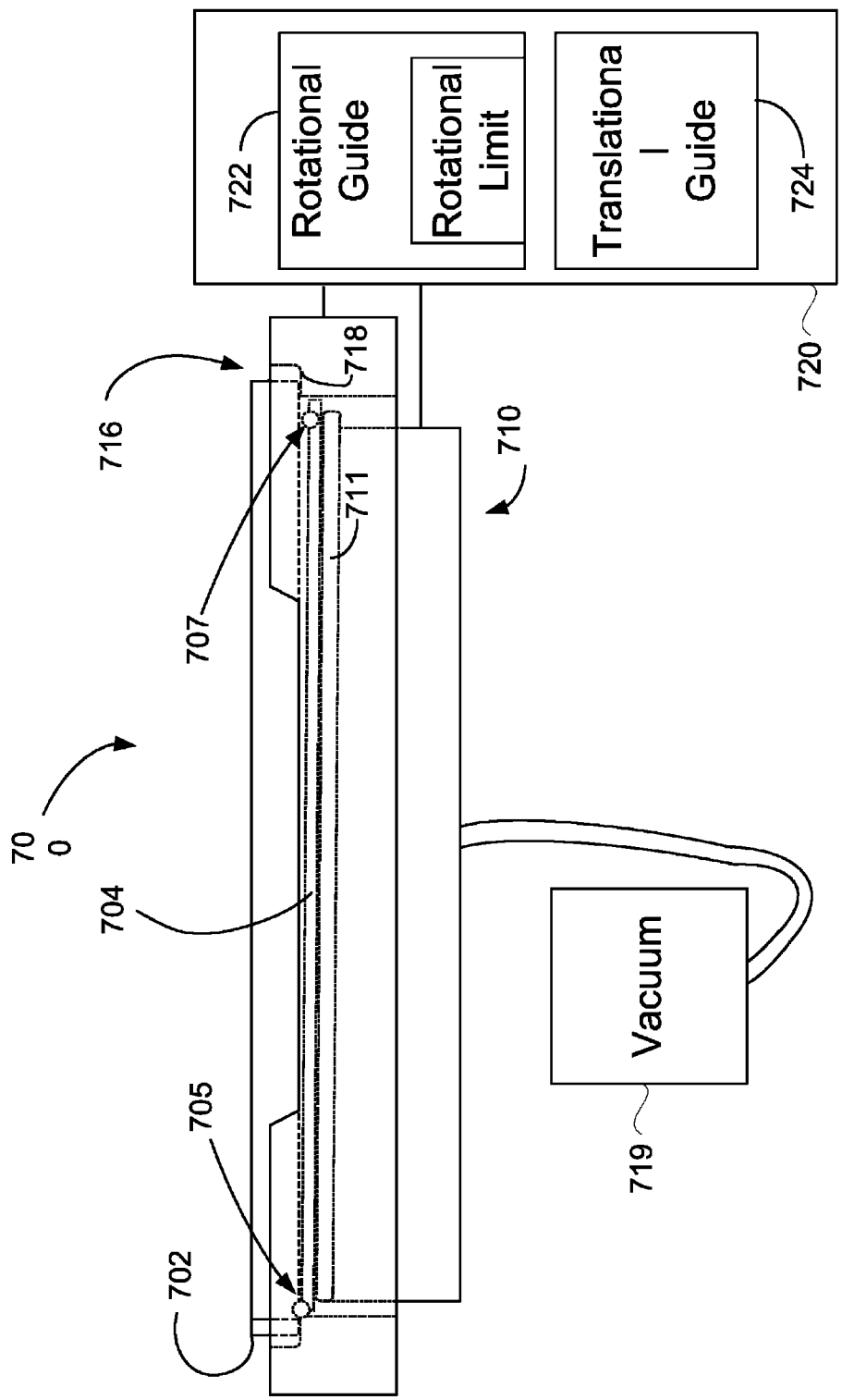

Next FIG. 7C shows the result of movement, which may be slight relative rotational movement between the first fixture 710 and the companion fixture 716, and which may be guided by a rotational guide member 722 of guide member 720. Further, as shown the figures, rotational guide member 722 may include a rotational limit member arranged for limiting relative rotational movement between the cover 704 and the frame member 702. Accordingly, the rotational limit member may limit the rotational movement to slight rotational movement. The rotational limit member may limit the rotational movement to substantially less than thirteen degrees of movement. The rotational limit member may limit the rotational movement to approximately half a degree of movement.

As shown in FIG. 7C, the rotational guide member 722 and its rotational limit member may be arranged for guiding, while also limiting relative rotational movement between the cover 704 and the frame member 702 about a pivot point, which may be proximate to extremities of the cover 704 and the frame member 702. In particular, as shown in FIG. 7C, the rotational guide member 722 and its rotational limit member may be arranged for guiding, while also limiting relative rotational movement between the cover and the frame member about such pivot point, which may be located adjacent to a proximate adhesive bond of bond material 705 between the cover 704 and the frame member 702, so as to substantially limit force applied to the proximate adhesive bond of bond material 705.

Limiting force applied to the proximate adhesive bond of bonding material 705, may in turn limit force applied to inner mid-plate of the frame member 702, which may substantially limit damage to inner mid-plate of the frame member 702. In other words, rotational guide member 722 and its rotational limit member may be arranged for guiding relative rotational movement between the cover 704 and the frame member 702 about such pivot point located adjacent to proximate adhesive bond of bonding material 705 between the cover 704 and the plate member of the frame member 702, so as to substantially limit force applied to the inner mid-plate of the frame member 702.

Careful review of differences between FIGS. 7B and 7C illustrates that limiting applied force at proximate adhesive bond of bonding material 705 may limit changes to the proximate adhesive bond, while sufficient force may be applied to the distal adhesive bond of bonding material 707 for breaking the distal bond. In other words, by guiding the rotation, applied force may be sufficiently limited so as to avoid breaking the proximate adhesive bond of bonding material 705, which may be disposed near one end of the portable electronic device 700 near the rotation's pivot point, while the rotation may still apply sufficient force for breaking of the distal adhesive bond of bonding material 707, which may be remotely arranged, for example near an opposing end of the portable electronic device 700. In FIG. 7C one end of the cover 704 is shown as not yet separated from the frame member 702, while the opposing end of the cover 704 is already separated from the frame member by the rotation. Accordingly, as shown in FIG. 7C, while limited force may be applied to the proximate adhesive bond of bonding material 705, by relative rotational movement between the first fixture 710 and the companion fixture 716 (guided by a rotational guide member 722 and its rotational limit member), sufficient force may be applied for breaking the distal adhesive bond of bonding material 707.

Figure 7D:
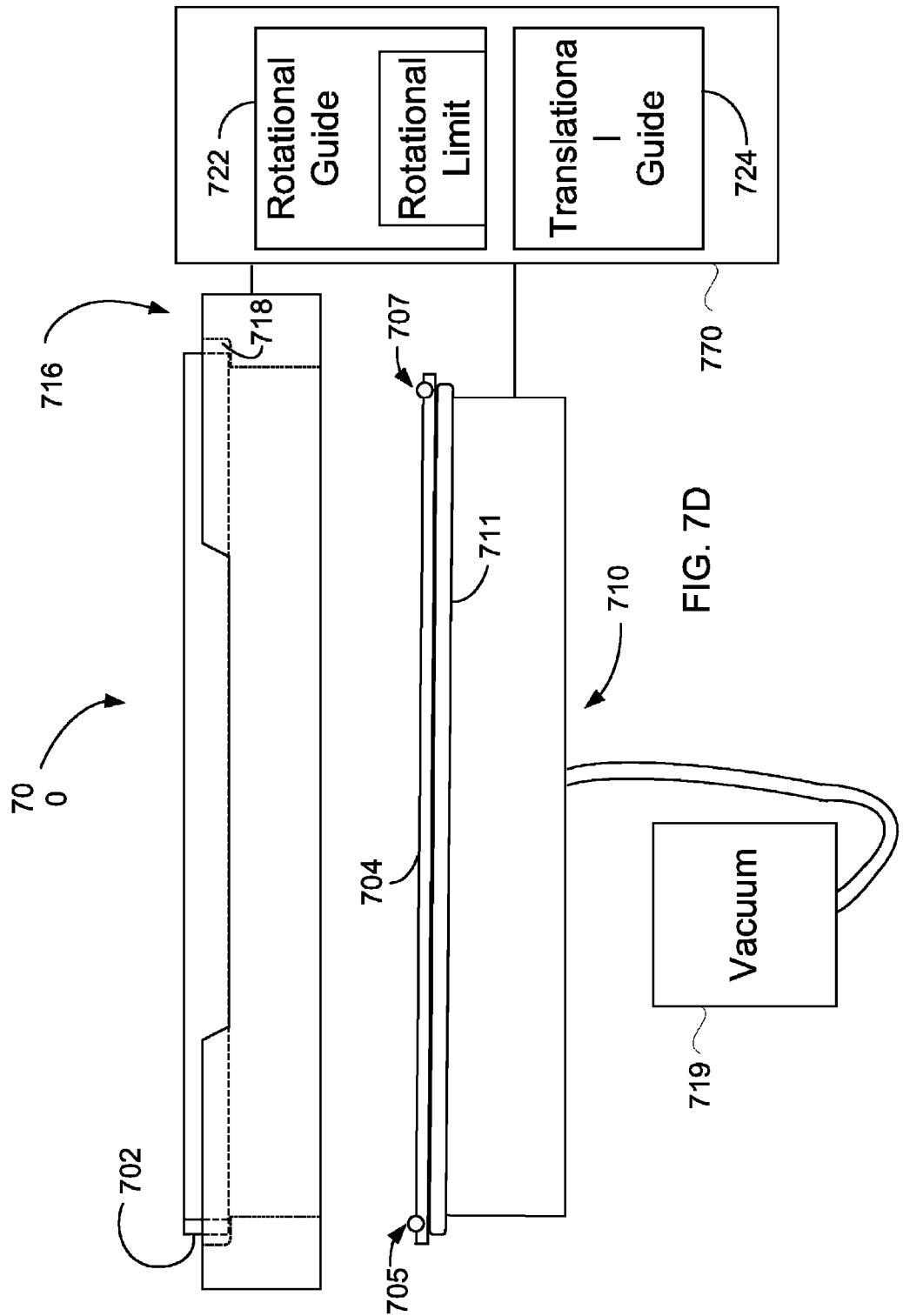

Next, FIG. 7D shows the result of translational movement, which may be relative translational movement between the first fixture 710 and the companion fixture 716, which may be guided by translational guide member 724 of the guide member 720. The translational guide member 724 of guide member 720 may be arranged with the first fixture 710 and the companion fixture 716 for breaking the proximate adhesive bond of bonding material 705 and allowing the cover 704 to be pulled from the frame member 702 of the portable electronic device 700. Relatively more force may have been required, if both proximate and distal adhesive bonds were to have been broken at about the same time. By first breaking the distal bond of bonding material 707 by slight rotation, and subsequently breaking the proximate bond of bonding material 705 by translation, relatively less force may be needed for breaking the proximate bond of bonding material 705. Limiting force needed for breaking the proximate adhesive bond of bonding material 705 may in turn limit force applied to inner mid-plate of the frame member 702, which may substantially limit damage to inner mid-plate of the frame member 702.

As representatively illustrated in FIGS. 7D, after the adhesive bonds are broken, all or substantially all or a significant portion of the bonding material 705, 707 may remain with the cover 704. Once the cover 704 is separated from the frame member 702 of the electronic device 700, the first fixture 710 may be fully withdrawn from the companion fixture 716. To provide for retrieval of the cover 704, for example, to provide for re-work of the cover, suction of vacuum unit 719 may be deactivated and cover 704 may be released from the first fixture 710. Similarly, after separation from the cover 704, a remainder portion of the electronic device, specifically frame member 702 and any associated electronic components, may be retrieved from companion fixture 716, for example, to provide for re-work thereof.

FIGS. 8A and 8B are a series of more detailed side views of the portable electronic device, further illustrating the disassembly of the portable electronic device that is shown in FIGS. 7A-7D. As shown in FIG. 8A, cover glass assembly 804 may be slightly rotated relative to frame member 802 of the portable electronic device 800, for breaking the distal adhesive bond of bonding material. Causing about one millimeter of separation at the opposing end of the portable electronic device may be sufficient. Next, FIG. 8B illustrates subsequent translational movement of cover glass assembly 804 relative to frame member 802 of the portable electronic device 800, for breaking the proximate adhesive bond of bonding material. Causing about one millimeter of separation at the one end of the portable electronic device may be sufficient for breaking the proximate adhesive bond of bonding material.

Figure 9A:
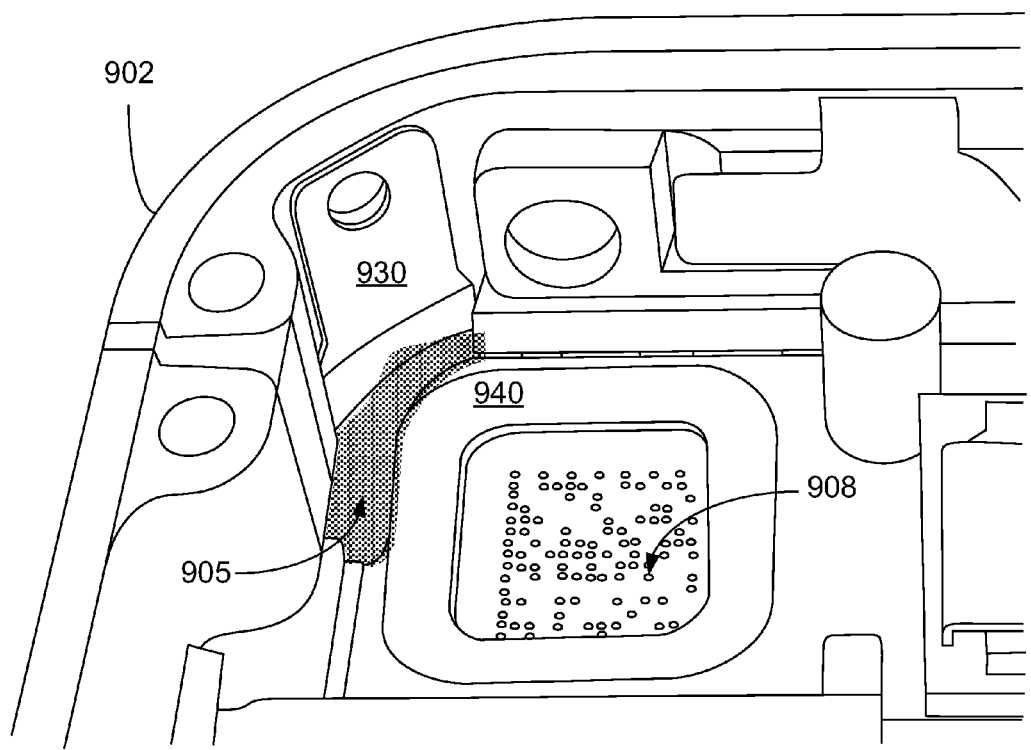
FIGS. 9A-9E are a series of even more detailed views of the portable electronic device, further illustrating the disassembly of the portable electronic device that is shown in FIGS. 7A-7D.

FIGS. 9A-9E are a series of even more detailed views of the portable electronic device, further illustrating the disassembly of the portable electronic device that is shown in FIGS. 7A-7D. First, an interior view of FIG. 9A of frame member 902 shows adhesive bonding material 905 of the previously discussed proximate adhesive bond between tab 930 of the cover glass assembly and frame member 902. The adhesive bonding material is highlighted in the figures using stippling. Inner mid-plate 940 of the frame member 902 may comprise metal, which may be over molded with plastic and coupled with band 902 about perimeter of the inner mid-plate 940. As shown in FIG. 9A, the inner mid-plate 940 of the frame member may have one or more apertures extending there through. In some of the figures, a back surface of a camera assembly 908 is visible through one of the apertures.

Figure 9B:
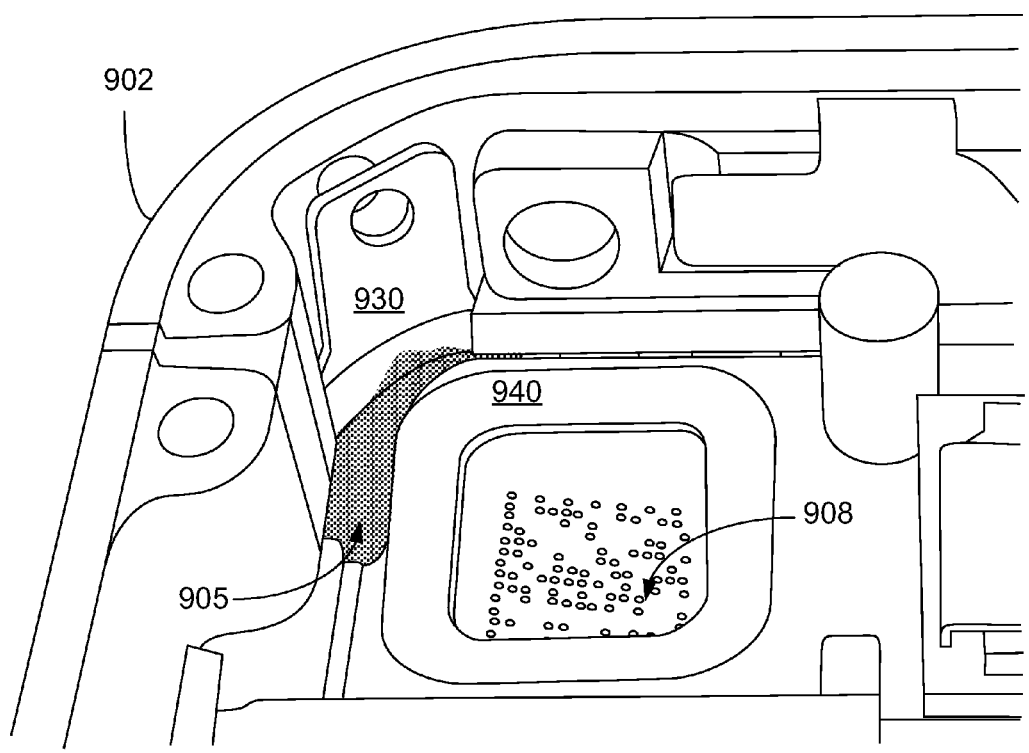

Next, FIG. 9B shows slight tilting of tab 930 of the cover glass assembly, which may correspond to slight rotation of the cover glass assembly relative to the frame member 902, in accordance with the disassembly discussion previously herein with respect to FIGS. 7A-7D.

Figure 9C:
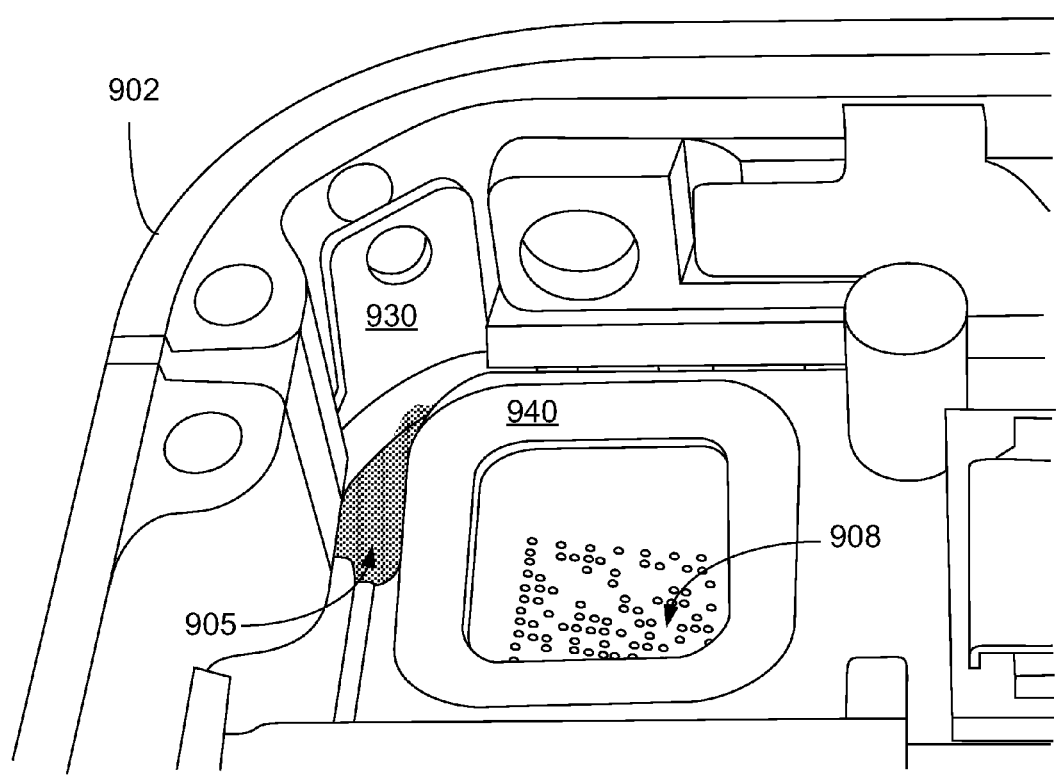

Next, FIG. 9C shows partial withdrawal of the tab 930 of the cover glass assembly, as the cover glass assembly begins separating from the frame member 902 in accordance with partial disassembly using the fixtures as previously discussed with respect to FIGS. 7A-7D.

Figure 9D:
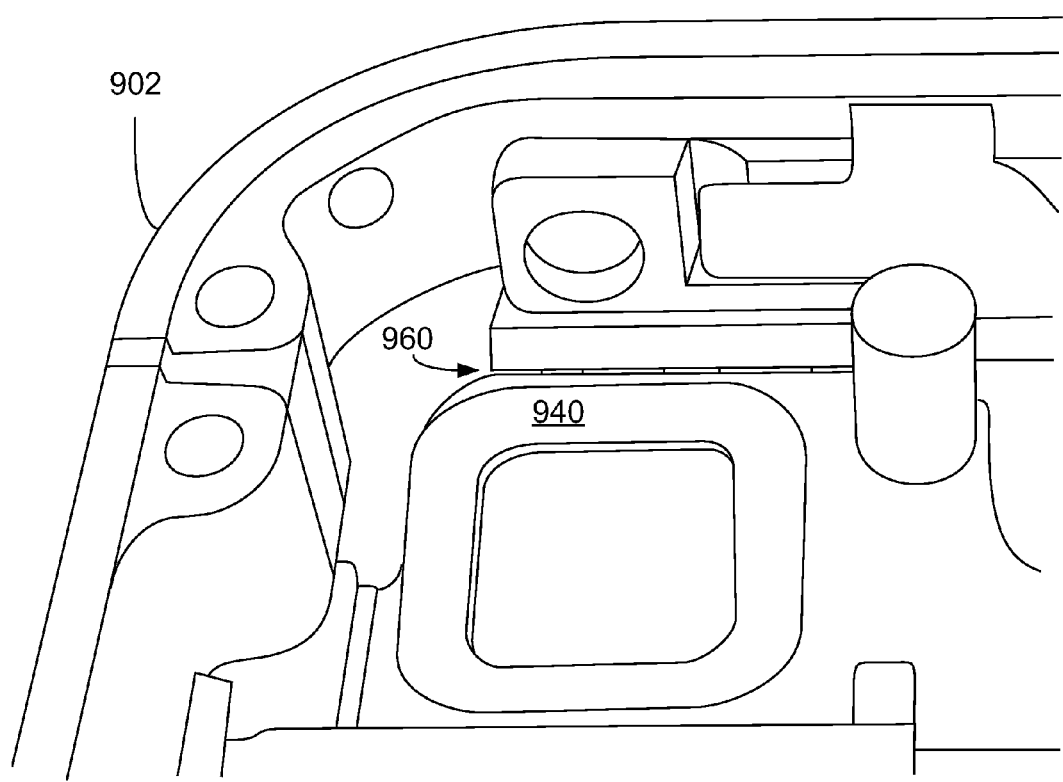
Figure 9E:
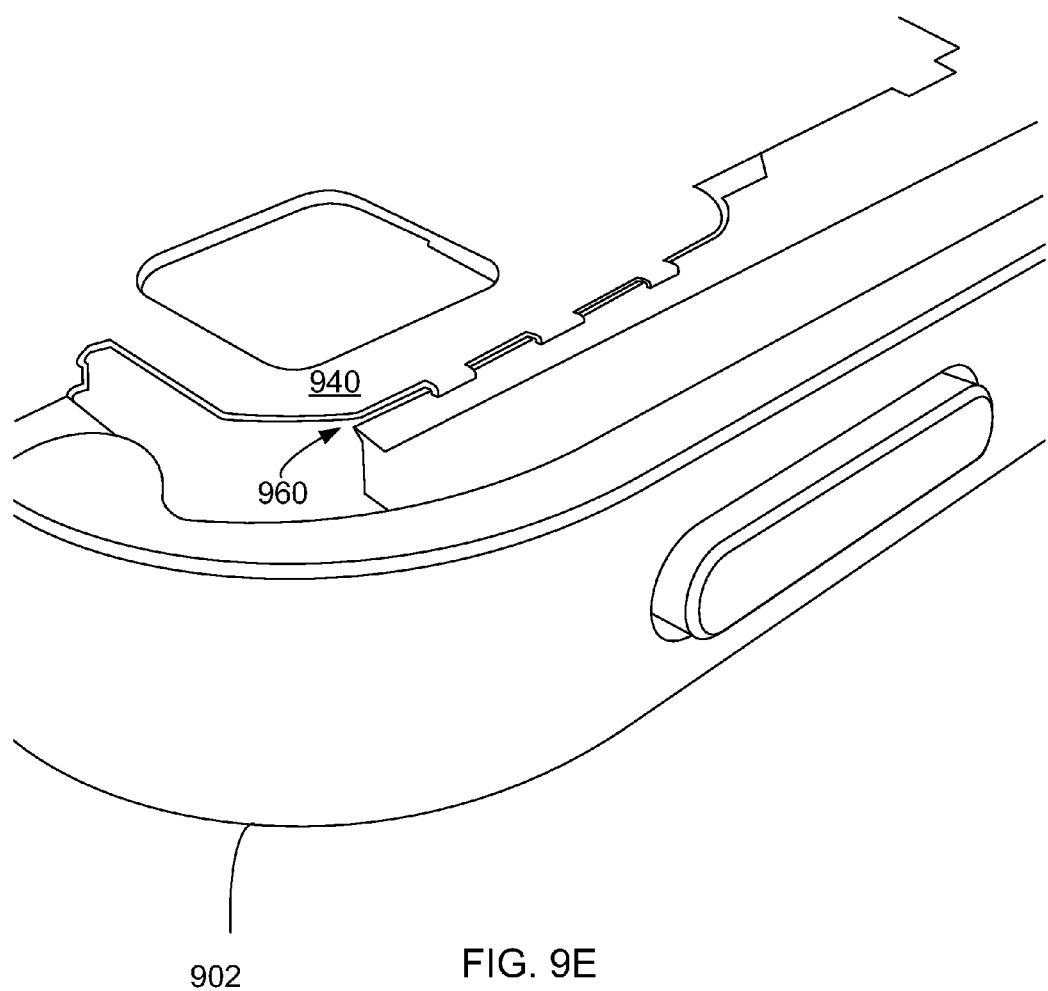

Next, FIGS. 9D and 9E show alternative inner and outer views of the frame member 902, after full separation of the cover glass assembly and complete disassembly using the fixtures as previously discussed with respect to FIGS. 7A-7D. Limiting force applied to the inner mid-plate of the frame member during separation of the cover assembly from may result in insubstantial damage 960 as shown in FIGS. 9D and 9E. In other words, insubstantial signs of damage 960 may be seen in FIGS. 9D and 9E, along with avoidance of de-lamination and/or avoidance of undesired separation of the metal of the inner mid-plate 940 of the frame member from the aforementioned over molded plastic of the frame member 902. Careful comparison of differences between FIG. 9D and FIG. 4C, and careful comparison of differences between FIG. 9E and FIG. 4D highlight damage that may be avoided.

Figure 10:
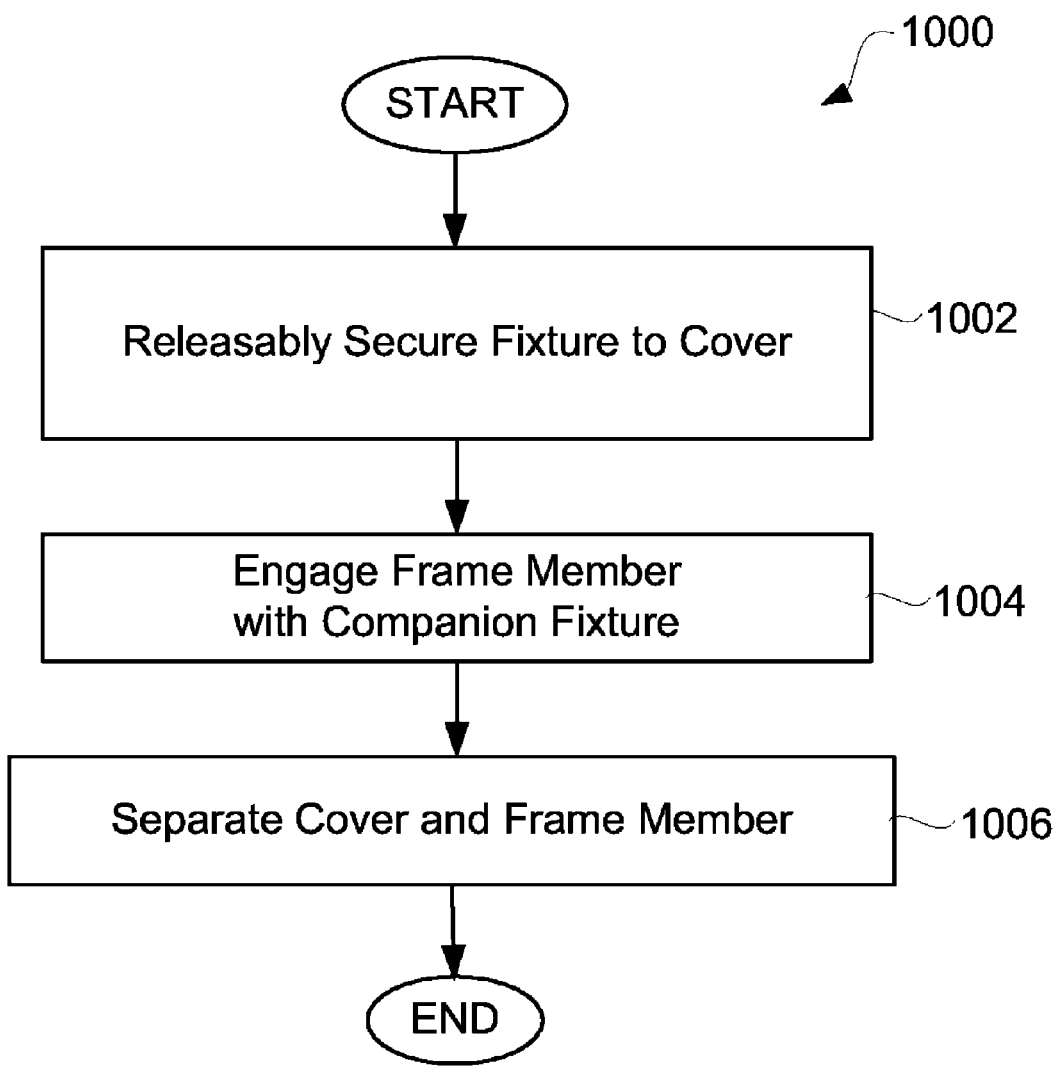
FIG. 10 is a flow diagram of a process, according to one embodiment.

FIG. 10 is a flow diagram of a process 1000 for disassembling a cover from a frame member of a portable electronic device. The process 1000 may begin with releasably securing 1002 a fixture to the cover. The process 1000 may continue with engaging 1004 the frame member with a companion fixture. The process 1000 may continue with separating 1006 the cover and the frame member.

In particular, the separating 1006 the cover and the frame member may comprise pulling the cover from the frame member. The separating 1006 the cover from the frame member may comprise relative rotational movement between the cover and the frame member of the portable electronic device. The relative rotational movement between the cover and the frame may be about a pivot point proximate to corresponding extremities of the cover and the frame. The relative rotational movement between the cover and the frame may be about a pivot point located adjacent to a proximate adhesive bond between the cover and the frame, so as to substantially limit force applied to the proximate adhesive bond. The relative rotational movement between the cover and the frame may be about a pivot point located remote from a distal adhesive bond between the cover and the frame, so as to allow application of sufficient force for breaking the distal adhesive bond.

The separating 1006 the cover from the frame member may additionally comprise relative translational movement between the cover and the frame, so as to allow application of sufficient force for breaking a proximate adhesive bond between the cover and the frame. Once cover and the frame member have been separated, the process 1000 can end.

Figure 11:
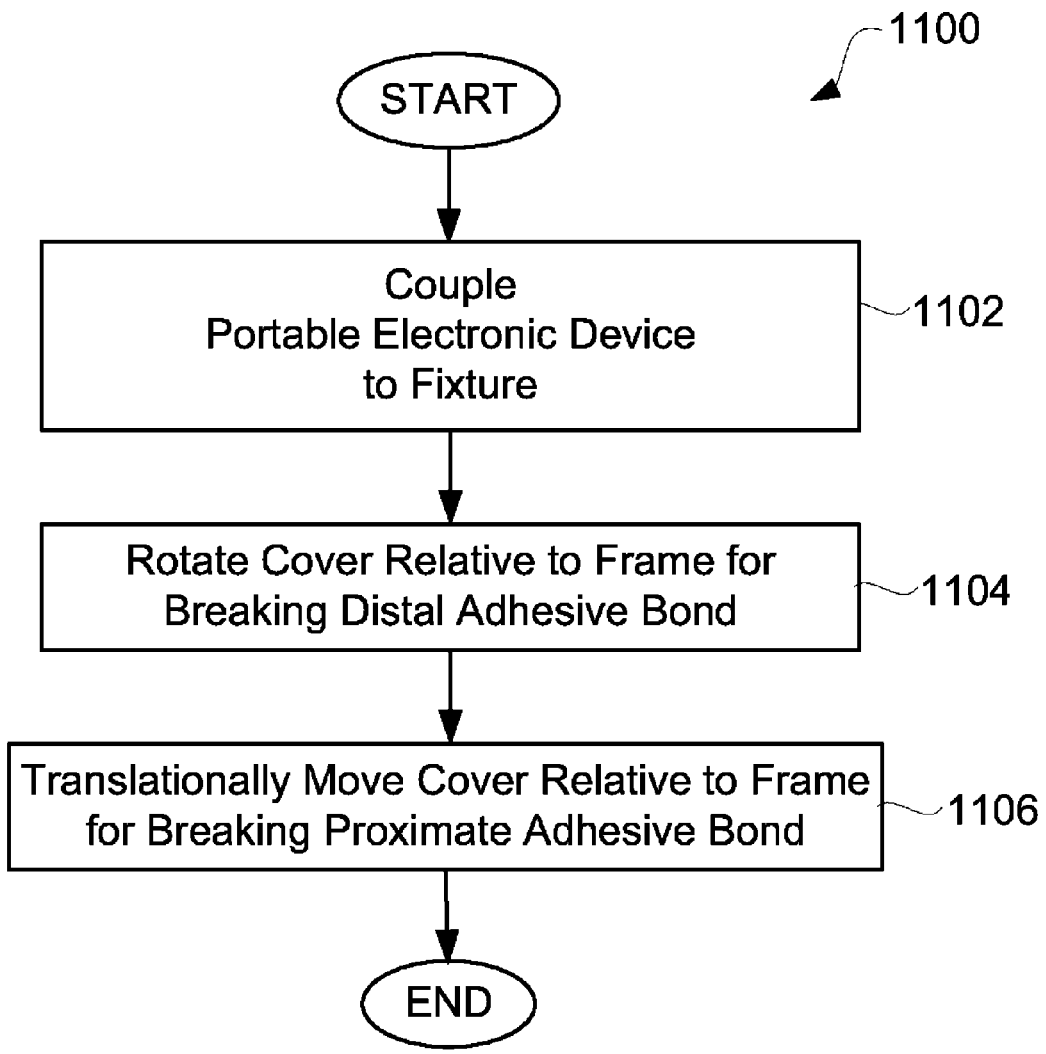
FIG. 11 is a flow diagram of another process, according to another embodiment.

FIG. 11 is a flow diagram of another process 1100 for disassembling a cover from a frame member of a portable electronic. Such process 1000 may begin with coupling 1102 the portable electronic device to at least one fixture. The process 1100 may continue with rotating 1104 relative to one another the cover and the frame member about a pivot point located remote from a distal adhesive bond between the cover and the frame, so as to allow application of sufficient force for breaking the distal adhesive bond. The process 1100 may continue with translationally moving relative to one another the cover and the frame member, so as to allow application of sufficient force for breaking a proximate adhesive bond between the cover and the frame member. Once the cover and the frame member have so moved translationally relative to one another, the process 1100 can end.

Figure 12:
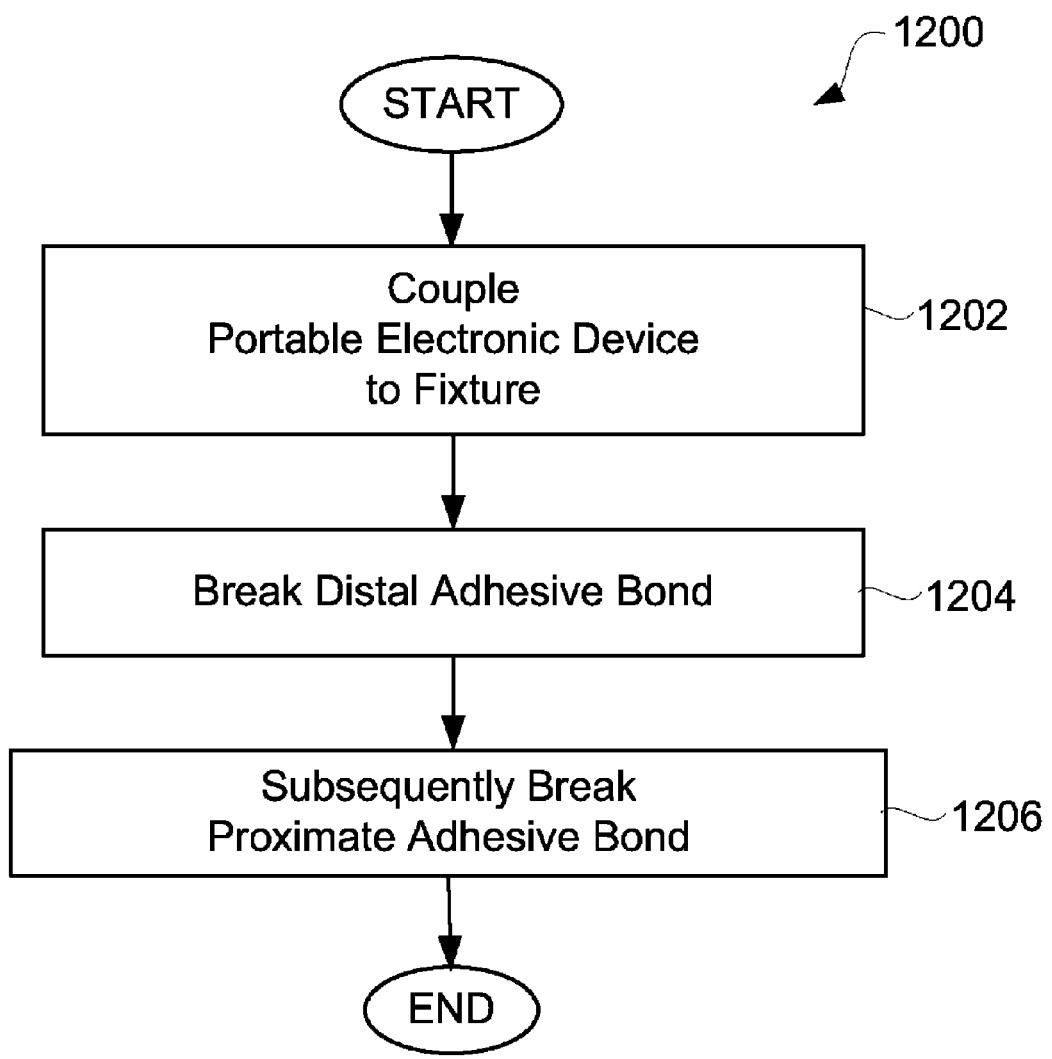
FIG. 12 is a flow diagram of yet another process, according to yet another embodiment.

FIG. 12 is a flow diagram of yet another process 1200 for disassembling a cover from a frame member of a portable electronic device comprising. Such process 1200 may begin with coupling 1202 the portable electronic device to at least one fixture. The process 1200 may continue with breaking 1204 a distal adhesive bond located between the cover and the frame and located remote from corresponding extremities of cover and frame member. The process may continue with subsequently breaking 1206 a proximate adhesive bond located between the cover and the frame and located proximate to the corresponding extremities of the cover and the frame member. Once the proximate adhesive bond has been broken, the process 1200 can end.

The advantages of the invention are numerous. Different aspects, embodiments or implementations may yield one or more of the following advantages. One advantage of embodiments of the invention may be that portable electronic devices may be disassembled for re-work more quickly, easily or efficiently. Another advantage may be that during disassembly, unintended damage to portable electronic devices or their constituent components such as frame members or frame mid-plates may be substantially reduced or eliminated.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for disassembling a cover from a frame member of a portable electronic device, comprising:
   releasably securing a fixture to the cover;
   engaging the frame member with a companion fixture; and
   separating the cover from the frame member by moving the fixture relative to the companion fixture.

2. A method as recited in claim 1, wherein the separating the cover and the frame member comprises pulling the cover from the frame member.

3. A method as recited in claim 1, wherein the separating the cover from the frame member comprises relative rotational movement between the cover and the frame member of the portable electronic device.

4. A method as recited in claim 1, wherein the separating the cover from the frame member comprises relative rotational movement between the cover and the frame about a pivot point proximate to extremities of the cover and the frame.

5. A method as recited in claim 1, wherein the separating the cover from the frame member comprises relative rotational movement between the cover and the frame about a pivot point located adjacent to a proximate adhesive bond between the cover and the frame, so as to substantially limit force applied to the proximate adhesive bond.

6. A method as recited in claim 1, wherein the separating the cover from the frame member comprises relative rotational movement between the cover and the frame about a pivot point located remote from a distal adhesive bond between the cover and the frame, so as to allow application of sufficient force for breaking the distal adhesive bond.

7. A method as recited in claim 1, wherein the separating the cover from the frame member comprises relative translational movement between the cover and the frame, so as to allow application of sufficient force for breaking a proximate adhesive bond between the cover and the frame.

8. A method for disassembling a cover from a frame member of a portable electronic device, comprising:
   inducing an angular removal force to the cover to partially break adhesive bonds between the cover and the frame member; and
   subsequently inducing a translational removal force to the cover to completely break the adhesive bonds between the cover and the force, thereby removing the cover from the frame member.

9. A method as recited in claim 8, wherein, following inducing of the angular removal force, adhesive bonds at one side between the cover and the frame member are broken.

10. A method as recited in claim 9, wherein, following the subsequent inducing of the translational removal force, adhesive bonds at any remaining sides between the cover and the frame member are broken.

11. A method for disassembling a cover from a frame member of a portable electronic, comprising:
   coupling the portable electronic device to at least one fixture;
   rotating relative to one another the cover and the frame member about a pivot point located remote from a distal adhesive bond between the cover and the frame, so as to allow application of sufficient force for breaking the distal adhesive bond; and
   translationally moving relative to one another the cover and the frame member, so as to allow application of sufficient force for breaking a proximate adhesive bond between the cover and the frame member.

12. A method for disassembling a cover from a frame member of a portable electronic device, comprising:
   coupling the portable electronic device to at least one fixture;
   breaking a distal adhesive bond located between the cover and the frame and located remote from corresponding extremities of cover and frame member; and
   subsequently breaking a proximate adhesive bond located between the cover and the frame and located proximate to the corresponding extremities of the cover and the frame member.

* * * * *